(12) United States Patent
Stegall

(10) Patent No.: US 9,072,966 B2
(45) Date of Patent: Jul. 7, 2015

(54) COMPUTER IMPLEMENTED PUZZLE

(71) Applicant: David Stegall, Los Angeles, CA (US)

(72) Inventor: David Stegall, Los Angeles, CA (US)

( * ) Notice: Subject to any disclaimer, the term of this patent is extended or adjusted under 35 U.S.C. 154(b) by 0 days.

(21) Appl. No.: 14/011,629

(22) Filed: Aug. 27, 2013

(65) Prior Publication Data

US 2013/0344927 A1    Dec. 26, 2013

Related U.S. Application Data

(63) Continuation-in-part of application No. 13/246,694, filed on Sep. 27, 2011, now Pat. No. 8,545,299.

(51) Int. Cl.
G06F 17/00  (2006.01)
A63F 13/00  (2014.01)
A63F 13/40  (2014.01)

(52) U.S. Cl.
CPC .............. *A63F 13/005* (2013.01); *A63F 13/10* (2013.01); *A63F 2300/61* (2013.01); *A63F 2300/8064* (2013.01)

(58) Field of Classification Search
CPC .................................................... A63F 13/005
USPC .......... 463/9–14; 273/271–274, 276, 283, 284
See application file for complete search history.

(56) References Cited

U.S. PATENT DOCUMENTS

| | | | |
|---|---|---|---|
| 6,378,867 B1 | 4/2002 | Shalless | |
| 7,419,158 B2 * | 9/2008 | Bohac | 273/153 R |
| 7,972,205 B2 | 7/2011 | Krishna | |
| 2002/0117802 A1 | 8/2002 | Seaberg | |
| 2003/0060250 A1 | 3/2003 | Chan | |
| 2003/0139210 A1 | 7/2003 | Raben | |
| 2004/0162126 A1 | 8/2004 | Rehm et al. | |
| 2004/0195765 A1* | 10/2004 | Bellefleur | 273/153 R |
| 2006/0281512 A1 | 12/2006 | Rehm | |
| 2007/0182097 A1 | 8/2007 | Dowe | |
| 2009/0124311 A1 | 5/2009 | Sandberg | |
| 2009/0298594 A1 | 12/2009 | Pueyo et al. | |
| 2011/0256513 A1 | 10/2011 | Levitt et al. | |
| 2012/0108306 A1 | 5/2012 | Munsell et al. | |
| 2013/0344927 A1* | 12/2013 | Stegall | 463/9 |
| 2014/0213333 A1* | 7/2014 | Hanes et al. | 463/9 |

OTHER PUBLICATIONS

International Search Report and Written Opinion mailed Dec. 18, 2012 for Application No. PCT/US2012/057611, filed Sep. 27, 2012, titled: Dynamic Puzzle Generation, Applicant David Stegall, 9 pages.

* cited by examiner

*Primary Examiner* — Ronald Laneau
(74) *Attorney, Agent, or Firm* — Novak Druce Connolly Bove + Quigg LLP

(57) ABSTRACT

Disclosed herein are systems and methods for providing a power-puzzler computer generated crossword puzzle which employs a unique and original combination of technology-based features to offer puzzlers of all skill levels a richer and more enjoyable crossword puzzle gaming experience. A master puzzle database (MPDB) consisting of lengthy solutions and corresponding hints associated with metadata is created and utilized to offer numerous improvements over previous crossword puzzle games. The improvement features include offering multiple hints to a lengthy solution which are particularly helpful to beginning puzzlers. Furthermore, unique keyboards are offered in many different embodiments to help a puzzler to type a letter which comprises a solution in a less screen space constrained environment. Puzzlers can also navigate the puzzle grid by selecting and shifting the cells to move or expand the selected cells and clues.

20 Claims, 19 Drawing Sheets

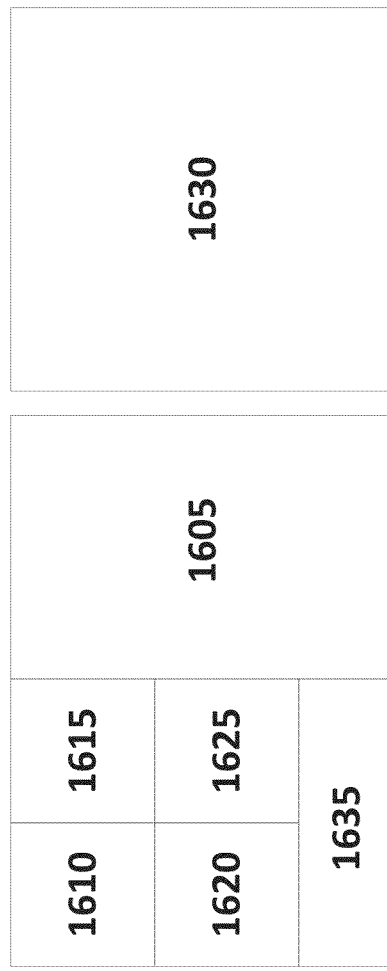

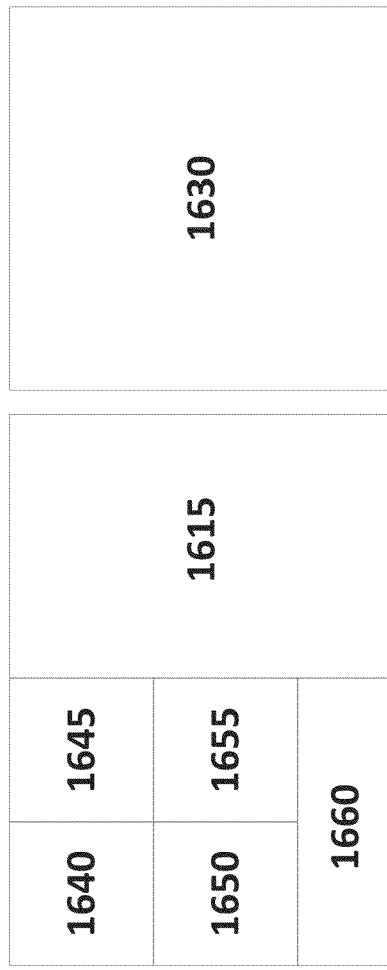

COMPUTER IMPLEMENTED PUZZLE

CROSS REFERENCE TO RELATED APPLICATIONS

This application is a continuation-in-part of and claims the benefit of U.S. application Ser. No. 13/246,694, filed on Sep. 27, 2011, which is expressly incorporated by reference herein in its entirety.

BACKGROUND

1. Technical Field

The present disclosure relates to electronic puzzles and more specifically to the display of crossword puzzles on a portable computing device.

2. Introduction

Millions of people in the United States today do crossword puzzles. With the increase in ownership of mobile personal computing devices such as smart phones and tablet PCs, puzzles traditionally offered on paper are now being offered electronically on computing devices. While providing puzzles electronically allows puzzlers to easily take their puzzles with them on the go, the small screen size associated with many mobile computing devices can result in difficulty playing puzzles. For example, the ability to read clues or type solutions can become increasingly difficult as the screen size decreases. This may decrease a puzzler's enjoyment of playing puzzles electronically on a mobile device.

Moreover, while many puzzlers enjoy doing crossword puzzles, many of those new to puzzling may find puzzles difficult to play. For example those new to puzzling may find lengthy solutions that contain ten or more letters to be intimidating even though these lengthy solutions frequently consist of familiar phrases, idioms or expressions known to most puzzlers. New puzzlers may be intimidated by these types of lengthy solutions because it is unclear whether the solution is a single or multiple words. Accordingly, a need for an improved puzzle exists.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems and methods for providing a computer generated crossword puzzle which can be played either individually or as part of a social network, which employs a unique and original combination of technology-based features to offer puzzlers of all skill levels and demographic backgrounds a richer, more enjoyable and, where desired, more social crossword puzzle gaming experience. By creating and utilizing a rich master puzzle database (MPDB), power-puzzler offers puzzlers numerous improvements over previous crossword puzzle games. In addition to traditional gameplay, power-puzzler offers many considerable improvements particularly helpful to beginning puzzlers or puzzlers playing crossword puzzle on a small screen of computing device.

The improvement features can include offering multiple hints to a lengthy or multi-word solution, which can be particularly helpful for beginning puzzlers. These hints can include presenting the number of words in the solution, number of letters in each word, or the first letter of each word. The hints can also provide the location of each word in the solution. This can help lead a puzzler to solve each word in the solution and arrive at the entire solution.

The present disclosure further discloses improved keyboards designed for use on devices with limited display screen space. Many mobile devices have small screens that may not provide enough room for the entire puzzle grid and the keyboard to be presented at an size adequate for easy use. As the keyboard may only be needed when typing the solution in puzzle games, in some embodiments, the keyboard can only be presented on the screen when the puzzler requests the keyboard. In some embodiments, the keyboard can be designed to place the most common letters in an outer part of the keyboard where there are less adjacent letters. As a result, the puzzler is less likely to accidentally select a wrong letter. In some embodiments, the keyboard can only present a subset of the entire alphabet, thus minimizing the screen space necessary to display the keyboard.

In some embodiments, the location of letters on the keyboard can be selected based on the data collected from the power puzzler application or individual puzzler. Further, the keyboard can be moved by a puzzler to a more convenient and unobtrusive location. In addition, the size of the keyboard can be changed by the puzzler.

Also disclosed is a navigation feature which can be applied to a puzzle grid. The essence of crossword puzzles is considering the intersecting clues and solutions to check if they are compatible with a proposed solution. As a result, a separate action may be requested to navigate the puzzle grid to see the different clues and solution. The puzzle grid can be navigated by selecting and shifting the cells that the puzzler wants to move or expand. The puzzler can select certain cells or clues to have an enlarged display or move the cells either horizontally or vertically to see different cells and clues. To increase readability, the cells can be moved automatically to fit in the screen regardless of their original location in the entire puzzle grid. Further, to minimize the confusion of reorientation, the solution and clues can be displayed in different colors.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 16A and 16B illustrate exemplary screenshots of primary and secondary information presented alongside a puzzle.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
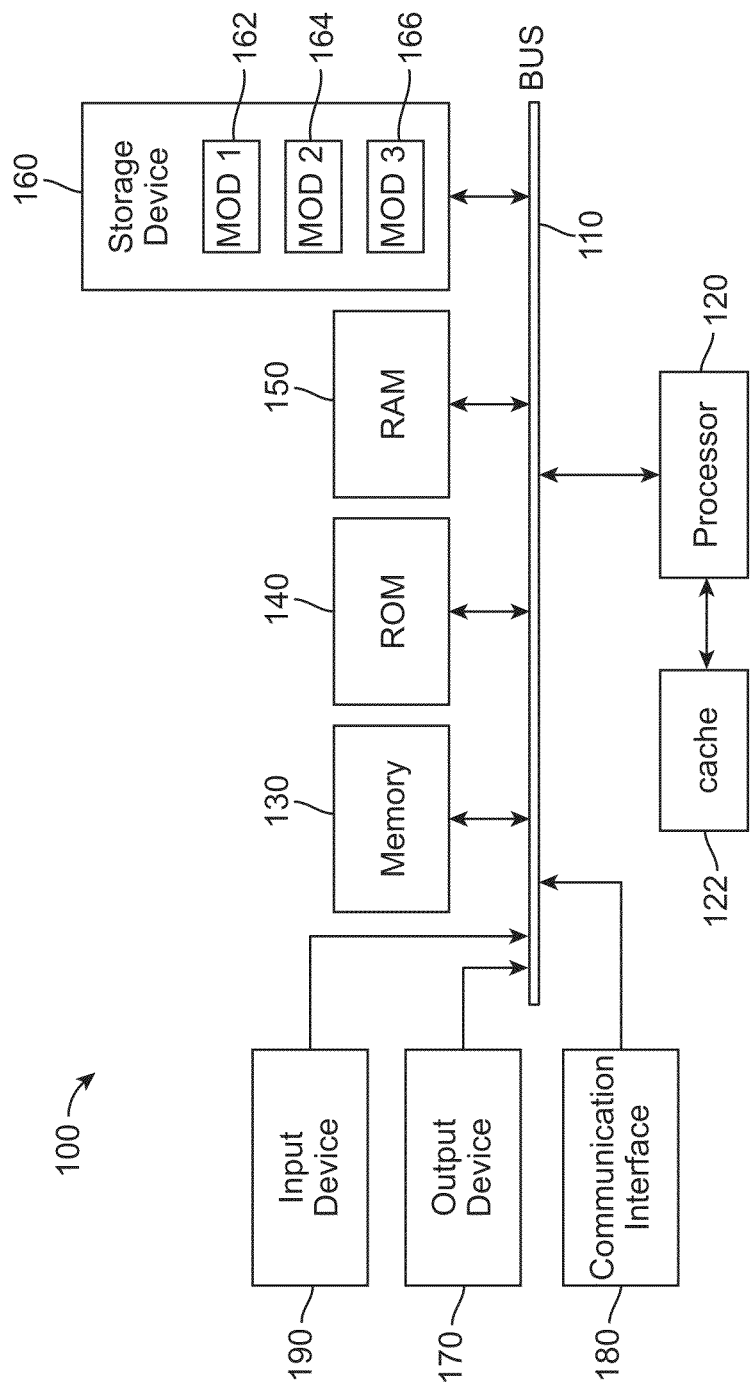
FIG. 1 illustrates an exemplary system embodiment.

FIG. 1 illustrates an exemplary system 100 that includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Definitions

A 'puzzler' is a person playing a crossword puzzle game.

An 'open cell' is the blank space in a crossword puzzle in which nothing has been entered and into which something, usually but not always a single letter, is to be inserted in order to complete the solution.

A 'closed cell' is a square in a crossword puzzle, which is filled (usually in black) to separate open cells (one solution) from each other (a different solution) and into which nothing is or can be entered.

The 'grid' is the entire presentation of all open and closed cells of a crossword puzzle.

A 'clue' is the information provided to assist the puzzler in arriving at the correct 'solution' to be inserted in the grid.

The 'solution' to a clue is the set of letters or other symbols which comprise the correct entry on the grid with respect to the clue.

The 'original puzzle' is the puzzle as it was originally constructed and presented to its intended audience.

A 'custom puzzle' is a puzzle containing clues and/or solutions which are based upon a variety of possible selections made by a puzzler.

Power-puzzler is a crossword puzzle application which employs a unique and original combination of technology-based features to offer puzzlers of all skills levels and demographic backgrounds a richer, more robust, more diverse more enjoyable and, in those instances in which puzzles are solved competitively or cooperatively, a more equitable and demographically appropriate crossword puzzle gaming experience. By creating and utilizing a rich master puzzle database (MPDB), power-puzzler offers puzzlers numerous improvements over previous crossword puzzle games. In addition to traditional gameplay, power-puzzler offers gameplay options focused on making the game accessible to players of all demographic backgrounds and skill levels. The fundamentally unique feature designed to achieve this goal is the availability of multiple clues of varying difficulty for the same solution. Power-puzzler puzzles can also offer multiple improvement features to help a puzzler understand and develop crossword strategies, skills and techniques fundamental to success. Unique scoring options are also offered. Scoring options can be based on multiple variables such as level of difficulty, elapsed time to complete an individual clue or the entire puzzle, percentage of solutions correct, as well as the demographic background or profile of the puzzler. Power-puzzler also enables puzzlers to create puzzles tailored to their specific preferences and interests. Puzzlers can customize their own puzzles, as well as compete and cooperate with other puzzlers, by defining game parameters such as categories of interest, level of difficulty, desired time to complete and demographic profile. Power-puzzler can also offer a rich personal as well as social gaming experience by providing clues and solutions which have been linked to related information on the web as well as allowing puzzlers to create a user profile to store demographic background, preferences and data reflecting a puzzler's past history on power-puzzler.

Figure 2:
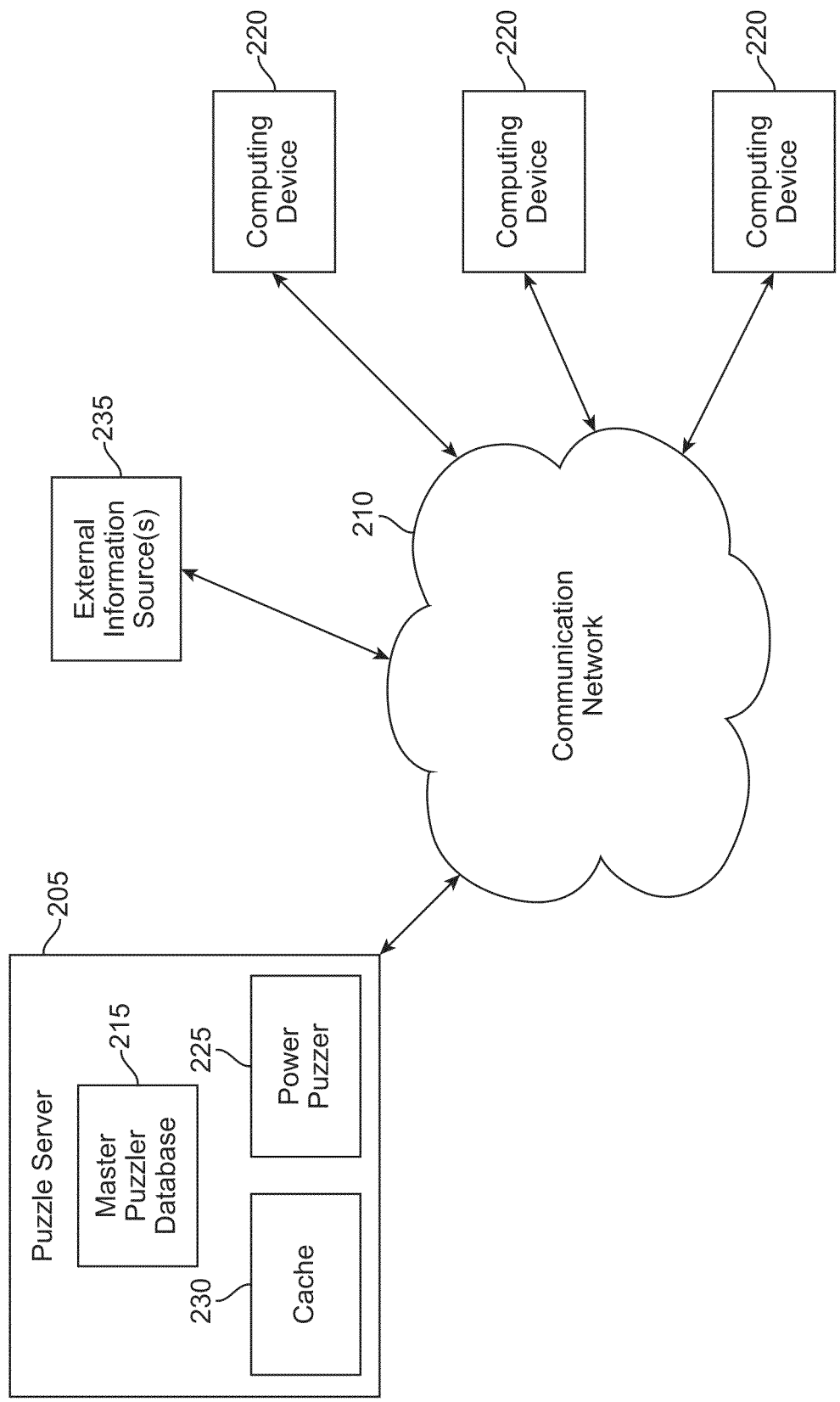
FIG. 2 illustrates an exemplary computing system in which power-puzzler can be implemented.

Having briefly described the power-puzzler application, the disclosure now turns to FIG. 2 which illustrates an exemplary computing system in which power-puzzler can be implemented. As illustrated, a puzzle server 205 can be connected to any number of computing devices 220 by a communication network 210. The puzzle server 205 can be a computing device similar to the one disclosed in FIG. 1. As illustrated, the puzzle server 205 can include a master puzzler database (MPDB) 215 and a master puzzler cache 230. In some embodiments the puzzle server can host and execute the power-puzzler application 225, for example as a cloud based system.

Figure 3:
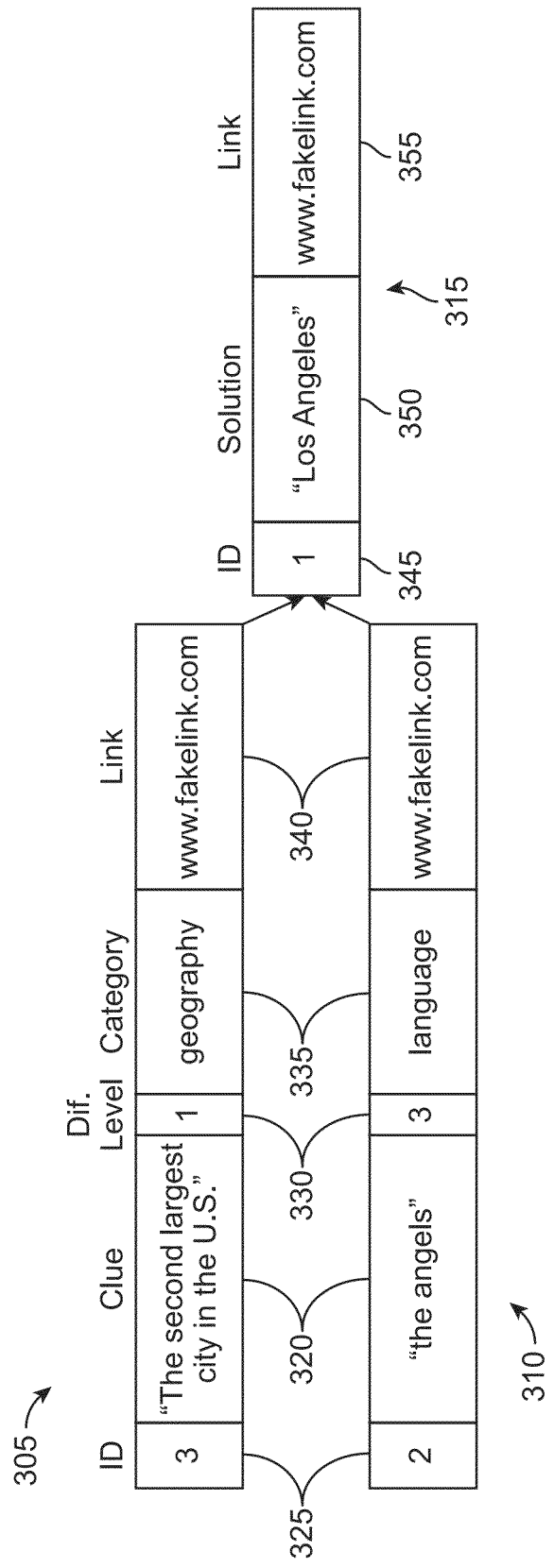
FIG. 3 illustrates exemplary master puzzler database entries.

The MPDB 215 is a database that can store and organize data used by power-puzzler 225 to create puzzles. The data stored in the master puzzler database 215 can include a plurality of clues and corresponding solutions. Each clue and its corresponding solution can be stored in the MPDB 215 as independent, but related, elements. Further, multiple clues can be associated with the same solution. For example, as illustrated in FIG. 3, the clue "the $2^{nd}$ largest city in the U.S.," 305 and the clue "the angels," 310 can both have the same solution "los angeles," 315 since Los Angeles is the second largest city in the U.S. and the Spanish translation of 'the angels.' Further, metadata describing the clues and solutions can be stored and associated with each clue and solution. The metadata can include any type of data describing or relating to a clue or solution, such as ID number, level of difficulty, source information, category, notes, theme, hyper-link to related material, etc.

While the puzzle server is illustrated as being hosted on a server accessible via a network, in some embodiments, the puzzle server can be encompassed in an application running locally on the devices 220.

External Information Source(s) 235 can be a website(s) of information related to clues or solutions. In some embodiments, the External Information Source(s) can be an advertisement provider. As illustrated in FIG. 2, the External Information Source(s) 235 can communicate with a Computing Device 220 or communicate with the Puzzle Sever 205 through Communication Network 205.

FIG. 3 illustrates exemplary MPDB entries. As illustrated, there are two clues 305 and 310 and both are associated with solution 315. The illustrated entries represent only a small sample of the many more potential database entries. Each clue includes a clue text data field 320 which stores the text of the clue. For example, clue 305 is "the second largest city in the U.S." and clue 310 is "the angels" and this text is stored in the clue text data field 320. In addition to the clue text data, each clue can also include an ID number 325, difficulty level 330, category 335, and link 340 data field.

The ID data field 325 can simply be used to identify the clue, for example clue 305 has an ID number of 3 and clue 310 has an ID number of 2.

The difficulty data field can be used to rank the anticipated difficulty of determining the solution based on the clue. The difficulty level can be ranked based on any criteria or using any scale. For example, the clue "the second largest city in the U.S." has a difficulty level of 1 because it is fairly common knowledge that Los Angeles is the second largest city in the U.S., whereas the clue "the angels" has a difficulty level of 3 because the solution is not as readily apparent. In some embodiments, the age of a particular puzzler, as well as other demographic elements, can also be a factor in determining the difficulty level of a particular clue.

The category data field 335 can be used to categorize the clue by subject. For example clue 305 has been categorized as geography and clue 310 has been categorized as language. In some embodiments, clues can be categorized by comparing key words and phrases in both the clues and solutions to a glossary of qualifying terms for each category and a glossary of disqualifying terms. If key words match with terms in the glossary of qualifying terms, the category associated with the qualifying terms can be assigned as the category of the clue and solution. If, however, other keywords in the same clue and solution are matches with keywords in the glossary of disqualifying terms for the same category as the previous matches, the category will not be assigned. A given clue/solution combination can have multiple categories designations, depending upon the clue provided or, in some embodiments, based simply on the solution alone. Such categories can also provide a foundation for targeted advertising to puzzlers which may be specifically related to the subject matter of the clue/solution.

Finally, both clues 305 and 310 include a link data field. The link data field can include a link to sources of additional information, explanation and entertainment, related to the clue. For example, clue 305 may include a link to a list of the largest cities worldwide, or information on Los Angeles. In some embodiments, the clue or solution can include uncommon or foreign language words and so the link can be to a definition and pronunciation of the word. As illustrated, both clue 305 and 310 are associated with a solution 315. Therefore, either clue can be presented to a puzzler to get the same solution. The solution 315 includes ID 345, solution text 350, and link 355 fields, each similar to those described for clues 305 and 310.

Returning to FIG. 2, to create the greatest possible number and variety of clues and solutions within the MPDB 215, the clues and solutions can be 'harmonized' to fit with multiple forms of the same base word, to the extent possible. For example, the clue "headwear" calling for the solution "hat" can be converted to be compatible with either the solution "hat" or "hats." Alternatively, if the clue is "sombrero" both the clue and the solution can be converted so that the clue "sombreros" is created and requires the solution "hats." The same process can be used with verb-based solutions. For example, the clue "have fun" calling for the solution "play," can be harmonized to be compatible with the solutions "plays," "played," and "playing" by converting the clue to "has fun," "had fun," and "having fun," as necessary.

In addition to puzzle data, the MPDB 215 can also create and store user profile information including demographic background and puzzling history gathered about a puzzler. This can include personal demographic data about a puzzler such as name, address, age, gender, interests, occupation, education, etc., as well as preference data concerning areas of expertise and interest. A user profile can also include information gathered about a puzzler in regards to their performance solving puzzles. For example, the user profile can gather the length of time it takes a puzzler to enter solutions to clues of varying difficulty and in different categories, as well as the accuracy of those answers. In some embodiments, this data can be aggregated for all puzzlers and used in determining and adjusting the difficulty level of clues based on actual puzzler performance.

User profile data can also be used as the basis for a "handicapping" system of equalizing players of varying levels of skill and knowledge and thereby facilitating and improving the competitive and cooperative aspects of power-puzzler as a social networking application. A puzzler's "handicap" can be indicative of the puzzler's skill level. A novice or relatively unskilled puzzler can be referred to as having a large handicap, whereas a skilled puzzler can be said to have a small handicap. A puzzler's profile can roughly approximate the level of difficulty of puzzles which a puzzler is able to complete with a prescribed level of accuracy. This handicapping system can allow members of a family or other social group, varying greatly in age and/or knowledge, to be able to participate more equally either as competitors or collaboratively in power-puzzler, creating a more open and enjoyable experience.

The data stored in the MPDB 215 can be searched and extracted by the power-puzzler application 225 to create puzzles. In some embodiments power-puzzler 225 can create a puzzle by re-using a layout of solutions from a previously created puzzle and substitute different clues associated with the solutions. In some embodiments power-puzzler 225 can create a puzzle to conform to parameters such as a number of solutions, and size dimensions of the grid. Once power-puzzler has created a puzzle, the puzzle can be stored in the master puzzler cache 230.

In addition to creating puzzles, the power-puzzler application 225 also provides a graphical interface for puzzlers to interact with and solve puzzles as well as interface with the application. In some embodiments, puzzlers can interface with the application to set settings or choose puzzles to solve. In some embodiments, the power-puzzler application 225 can be running on the puzzler server 205 and accessed by a computing device 220 through use of the communication network 210. In some embodiments the power-puzzler application 225 can be downloaded to a computing device 220 and run from the computing device 220. In this type of embodiment, puzzles can also be downloaded from the puzzle server 205 so that the communication network 210 is not needed to run power puzzler 225 or alternatively, power-puzzler 225 can still communicate with the puzzle server 205 over the communication network 210 to access the MPDB 215 and power puzzler cache 230. In some embodiments, the puzzle server 205 and the computing device 220 can be the same computing device and so power-puzzler 225 can be accessed and played locally without need to connect to the communication network 210.

Game Features

The computing system disclosed can be utilized to offer a variety of novel game features.

1. Additional Clues

In some embodiments a puzzler can select additional clues with different levels of difficulty than those presented in the original puzzle. This feature can be useful to a puzzler who is unable to solve a clue in an original puzzle. If a clue of the selected level of difficulty is available, it will be presented, if not, the puzzler can be given the opportunity to select a clue of a higher or lower level of difficulty. A puzzler can continue to request as many additional clues as he or she chooses. Each time a puzzler exhausts the clues of a selected level of difficulty, the puzzler can be given the option of selecting clues of a higher or lower level of difficulty, as applicable. Additional clues can continue to be presented as requested until the puzzler enters a solution, elects to move to another clue, or exhausts the supply of available clues for that solution. In some embodiments, foreign language clues in a number of different languages, such as Spanish, Chinese, Hindi, Russian, Japanese, French, German, Italian, etc., can also be included in the MPDB and chosen by a puzzler. This can facilitate access and use of power-puzzler to bi-lingual puzzlers or puzzlers for whom English is a second language. Such foreign language clues can include parallel or similar idioms and expressions between the specific language and English where available. In some embodiments, accessing a foreign language clue can enable a link to explanatory materials and dictionaries relating to the solution, which can include pronunciation of the English word or expression and/ or the foreign word or expression.

2. Improvement Features

In addition to the ability to select additional clues based on their level of difficulty, in some embodiments power-puzzler can provide certain improvement features to help a puzzler understand and develop crossword strategies, skills and techniques fundamental to success. Improvement features consist of a variety of distinct puzzle attributes which can be individually enabled or deselected by a puzzler. They are intended to demonstrate the value of certain strategies, techniques, skills and approaches to a puzzle and, by doing so, to help a puzzler succeed and improve. Among these improvement features are: (1) BEGIN WITH THE BASICS, (2) CONFIDENCE CHARACTERS, (3) EVEN ONE LETTER, (4) KEEP MOVING/TIMING CUES, (5) HELPFUL ENDINGS, (6) GOOD BEGINNINGS, (7)-(8) CHECK or DISCLOSE A LETTER, SOLUTION OR THE ENTIRE PUZZLE, (9) EVEN THE WRONG ANSWER, (10) THINK AGAIN, (11) SHORT & SWEET, (12) YA GOTTA BELIEVE and (13) LENGTHY SOLUTION. A puzzler can be able to access an explanation of the purpose and benefit of each improvement feature through the puzzle grid. Each of these features and the manner in which they operate is discussed below. P (1) BEGIN WITH THE BASICS: This unique feature encourages a novice or beginning puzzler to select the puzzle clues from the lowest level of difficulty available. Selection of this feature can highlight those solutions for which a clue with a level of difficulty of 1 is available. If no clue with a level of difficulty of 1 is available, this feature can indicate the lowest level of difficulty clue which is available for that solution. By selecting this feature, those clues can be highlighted on the puzzle. This way a puzzler can start with the easiest clues which can assist in solving harder clues as letters are filled in on the puzzle grid.

(2) CONFIDENCE CHARACTERS: This novel feature can enable a puzzler to distinguish among solutions which s/he has entered to indicate her/his level of confidence in that entry. In some embodiments, a puzzler can be provided with different characters, symbols, icons or colors used to delineate those solutions for each category.

(3) EVEN ONE LETTER: This feature can insert one letter in each solution at the beginning of a puzzle to help a beginning or struggling puzzler recognize the value of even one letter, and particularly the first letter, in arriving at a solution. This feature can encourage puzzlers to be willing to insert individual letters which they believe to be correct even when an entire solution is not known.

(4) KEEP MOVING/TIMING CUES: This feature can limit the time which can be spent on any clue or section of a grid on a puzzler's initial pass through the puzzle until a certain percentage of clues in that section of the grid have been completed or until each clue has been initially addressed. This feature can help every puzzler, no matter how advanced or experienced, understand and remember the benefits of moving through the entire puzzle quickly rather than becoming trapped pondering a particular clue or group of clues without looking at the remaining clues in the puzzle. The times allowed can be restarted for each additional clue selected.

(5) HELPFUL ENDINGS: This feature can direct the puzzler to clues from which s/he can deduce likely parallel word endings in a solution, such as clues in which the operative word in the clue ends in "s, ed, ing, er, ier, est or iest" or a word connoting the same meaning, such as "comparatively" for "er" or "in the process of" for "ing," even though the entire solution may not be known. This feature, combined with the benefits gleaned from the "EVEN ONE LETTER" can help a puzzler to progress more rapidly as well as succeed.

(6) GOOD BEGINNINGS: This feature can direct the puzzler to clues from which s/he can deduce likely beginning letters in a solution such as "re" or "a" for clues which contain the words "over" "again" "anew" indicating the repetition of an act, even though the entire solution may not be known. This feature, combined with the benefits gleaned from the "EVEN ONE LETTER" feature can help a puzzler to progress more rapidly as well as succeed.

(7) CHECK LETTER, SOLUTION OR ENTIRE PUZZLE: This feature can allow the puzzler to determine whether a specific letter, the letters entered in a solution or the letters entered in the entire grid are correct. This feature can indicate, at the request of the puzzler, a letter or letters (in a solution or grid) which are incorrect. If a solution or the entire puzzle is selected to be checked, the puzzle can indicate each incorrect letter, if any.

(8) DISCLOSE LETTER, SOLUTION OR ENTIRE PUZZLE: This feature can allow the puzzler to have any incorrect or open cells filled by the puzzle with the correct letter(s).

(9) EVEN THE WRONG ANSWER: This feature can insert solutions which, while plausible, are not correct, but nevertheless contain certain of the correct letters in some of the intersecting cells. The entry can be denoted by a confidence character suggesting a moderate level of certainty. This feature is intended to demonstrate the value of inserting a possible solution, even if it turns out to be incorrect, because of the potential value of intersecting letters in the puzzle grid.

(10) THINK AGAIN: This feature can highlight certain clues which require additional consideration of the clue or the solution in order to arrive at the correct solution. In many instances, these clues can contain an indication such as a question mark, unusual spelling, or unusual capitalization, which denotes that special consideration is required. In some embodiments, this feature can simply highlight a clue to call the puzzler's attention to the fact that additional thought is required. In some embodiments, the feature can, where appropriate, highlight the specific word or aspect of the clue which requires special consideration.

(11) SHORT & SWEET: This feature can highlight certain clues containing an abbreviation. Such abbreviations can indicate that the answer also contains an abbreviation. It is anticipated that this feature can be disabled by a puzzler once s/he advances beyond beginning levels.

(12) YA GOTTA BELIEVE: This feature can highlight either a specific cell or cells in a puzzle grid when the solution requires that something other than a single alphabetic letter be inserted in the cell or cells. It can also highlight a specific cell or cells when the solution calls for insertion of something other than a word. An example is a solution which calls for the insertion of "BBBB" in place of the word "BEES" or the insertion "IIII" in place of the word "EYES" or "III" in place of "IZE". The title of this improvement feature is a reminder that when a puzzler concludes that a simple letter or a standard word will not fit in the allotted cells, but is certain that s/he knows the correct solution, s/he must have the confidence to insert what s/he believes to be correct.

(13) LENGTHY SOLUTION: In some embodiments, the power puzzler application can be configured to provide a hint to help a puzzler solve a lengthy solution. For example, solutions that contain a high number of letters such as 10 or more letters can be difficult to solve because the puzzler is unsure whether the solution is one word or multiple words. To aid the puzzler in solving these types of lengthy solutions, the power puzzler application 225 can be configured to provide a hint that provides the number of words in the solution. For example, if the solution is "onceuponatime" the hint could present to the puzzler that the solution contains 4 words. If the puzzler is still unable to solve the solution, in some embodiments, the power puzzler application can be configured to further provide the puzzler with the number of letters in each word. For example, if the solution is "onceuponatime" the hint can provide the puzzler with an output of "4-4-1-4" that indicates that the first word has 4 letters, the second word has 4 letters, the third word has 1 letter and the fourth word has 4 letters.

In some embodiments, the hint can further provide the puzzler with the first letter of each word or provide a question mark in the cell of the first letter of each word. For example, the first letter of each word can be presented in the cell corresponding to the first letter of each word in the solution. Although the different types of hints described for a lengthy solution are described separately, this is just for ease of explanation. In some embodiments, the hint to a lengthy solution will include all of the functionality described above. In some embodiments, the functionality can be accessed separately as different levels of hints to a lengthy solution.

To facilitate the described hints to a lengthy solution, the power puzzler database entry associated with each solution can include further data that can be used to derive the number of words in the solution, the number of letters in each solution, the first word in each solution and the position of the first word in each solution. In some embodiments, the power puzzler database entry for each solution can include a data field containing the described data. For example the power puzzler database entry for the solution can contain a data field for the number of words, the number of letters in each word, the first letter in each word and the position of the first letter in each word. In this type of embodiment, the power puzzler application 225 can simply access the appropriate data field to retrieve the data to be presented to the puzzler. For example, to provide the puzzler with the number of words in the solution, the power puzzler application 225 can access the data field including the number of words in the solution and return the number to the puzzler.

In some embodiments, the power puzzler database entry associated with a solution can include only the position of the first letter of each word in the solution and the power puzzler application can be configured to derive the number of words in the solution, the length of each word in the solution and the first letter of each word in the solution. For example, if the solution is "OnceUponATime" the power puzzler database entry can include the data "1, 5, 9, 10" to represent the position of the first letter in each word. The power puzzler application 225 can derive the number of words in the solution by counting the number of positions provided. For example, because 4 first letter positions are provided, the power puzzler application can derive that there are 4 words in the solution.

Further, the length of a word can be derived by subtracting the position of the first letter of a word from the position of the first letter of the next word. For example, the length of the first word can be derived by subtracting the position of the first letter of the first word "1" from the position of the first letter of the next word "5". Thus the power puzzler application can determine that the first word has 5−1=4 letters. For the final word, the power puzzler application can subtract the position of the first letter of the final word "10" from the length of the solution plus 1. Thus the power puzzler application can derive that the last word has 13+1−10=4 letters.

Finally, the provided position of the first letter in each word of the solution can be used to output the first letter in each word. For example, the solution can be stored as a character array and the power puzzle application can be configured to output the corresponding letter positions in the character array.

Customized Puzzles

In some embodiments, a puzzler can customize puzzles based on parameters selected by the puzzler. For example, the power-puzzler application 225 can prompt a puzzler to choose from several parameters such as difficulty level, number of clues, categories, etc. Once the parameters are entered, power-puzzler 225 can search the MPDB 215 for clues and answers matching the entered parameters and use them to create a puzzle.

Creating a puzzle exactly matching the parameters specified by the puzzler may not always be possible. This type of situation can be handled in numerous ways. In some embodiments, the puzzler can be prompted to prioritize their parameters. For example, a puzzler can set parameters so that only clues from the sports and music category are used and that all clues have a difficulty level under 3. The puzzler can prioritize these selections so that including clues from sports and music is more important than all clues having a difficulty level under 3. If there are not enough clues in the database to create the puzzle based on the chosen parameters, power-puzzler will give priority to the sports and music category and can use clues from these categories with a difficulty level higher than 3 rather than use clues with a difficulty level under 3 but from a different category. In some embodiments, power-puzzler 225 can make the puzzle as close to the puzzlers' selections while inserting other clues as necessary without consulting the puzzler. In some embodiments, power-puzzler 225 can notify the puzzler that the puzzle is not possible as requested and suggest changes to the chosen parameters that will result in a puzzle being created.

In some embodiments, the puzzler can customize a puzzle based on parameters unique to that puzzler. For example, a puzzler with a limited amount of time may wish to create and play a puzzle which should take only 30 minutes to complete. The power-puzzler application 225 can access the data stored in the puzzler's user profile and estimate a combination of clues and answers to include, which, based on available data about the puzzler to complete questions of certain difficulty and in certain categories, should take the puzzler the chosen time to fully complete. The more puzzles a puzzler solves, the greater the amount of data collected in the puzzler's user profile and the more accurate this feature can be.

Scoring

Power-puzzler 225 can also offer unique and customizable scoring options which will take advantage of power-puzzler's unique technologies and facilitate both competition and cooperation between and among puzzlers. The scoring system can be based on multiple variables such as the level of difficulty of the clues in the original puzzle, the number of additional clues requested by the puzzler and their levels of difficulty, the time taken to enter an individual solution or to complete an entire puzzle, the percentage of solutions correctly completed, use of various improvement features, etc.

The scoring can be configured in any number of ways. For example, in some embodiments, each variable will be assigned a value in the scoring system to approximate the level of skill evidenced by the completion of that particular puzzle in the time taken. The highest score possible for an individual can be based on accurately completing an entire puzzle, with clues from the highest level of difficulty, in the shortest amount of time without any assistance from the system in providing additional clues, or other improvement features. In this type of embodiment, points can be deducted from the score based on the number of requests for additional clues and the level of difficulty of the requested clues as well as the time taken to solve the clues. For example, a clue in the science category with a difficulty level of 5 can be assigned 10 points if the correct solution is entered by the puzzler within a predetermined period of time. From that score points can be deducted for each additional clue the puzzler requested. For example, if a puzzler requested an additional clue with a difficulty level of 1, 5 points can be deducted. If instead the puzzler had requested an additional clue of difficulty level 4 only 1 point might be deducted.

A similar system can be used to score based on time. In some embodiments, a predetermined time can be set to solve a clue based on difficulty level. If a puzzler enters the solution prior to this time expiring, the puzzler can be awarded full points, if the puzzler does not enter the solution within the predetermined time, points can be deducted. In some embodiments, there can be multiple predetermined times so that a puzzler will have more points deducted the longer it takes for them to enter the solution. In some embodiments, scoring based on time can be based on the completion of the entire puzzle rather than based on individual answers.

When a puzzle is completed by a puzzler, a score can also be given based on the percentage of correct solutions and this score can be added to the total. For example, a puzzler can be awarded 50 points for completing the puzzle and that score can be reduced based on the percentage of correct solutions given. If a puzzler correctly entered 100% of the solutions then the puzzler would be awarded the full 50 points. If, however, the puzzler only entered 80% of the solutions correctly, the puzzler would only be awarded 80% of the 50 points, i.e., only 40 points. This total can then be added to the point total scored for solving the individual clues.

In some embodiments, a final score can be calculated by multiplying the total score earned from solving clues by the percentage of correct solutions. For example, if a puzzler earned 100 points from solving clues and, upon completing the puzzle it is determined that the puzzler only solved 80% of the clues correctly, the puzzler's total score would be 80 points. If, however, the puzzler solved 100% of the clues correctly, the puzzler would receive the full 100 points.

Figure 4:
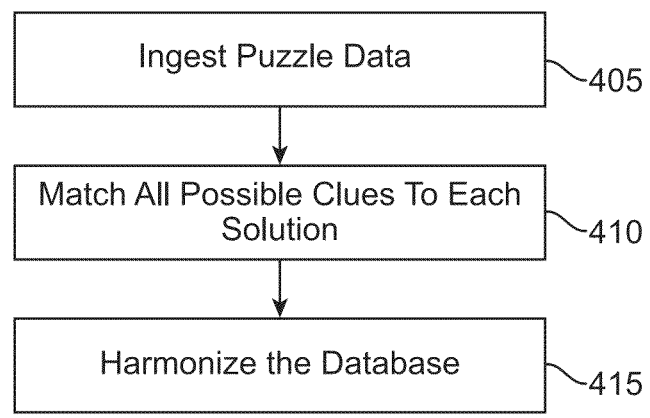
FIG. 4 illustrates an exemplary method embodiment of creating a master puzzler database.

FIG. 4 illustrates an exemplary method embodiment of creating a master puzzler database. At step 405 puzzle data is ingested by a puzzle server. Puzzle data can include clues associated with solutions as well as metadata describing the clues and solutions. The metadata can include level of difficulty, source, categories, links to further information, notes, etc. The metadata associated with the puzzle data can be included from the source prior to the puzzle data being ingested. For example, puzzle data published in certain newspapers already has a difficulty level associated with it based on the day of the week the puzzle is published. Puzzle data can be ingested from any possible electronic format. Puzzle data not in electronic format can be converted from its original source into electronic format through the use of scanners and electronic character recognition software. Alternatively, puzzle data can be manually entered into the master puzzler database. The ingested puzzle data can be stored in the master puzzler database.

At step 410 solutions can be matched with all stored clues to which the solution correctly solves the clue. Therefore, multiple clues can be associated with a single solution.

At step 415 the clues and solutions can be 'harmonized' to fit with multiple forms of the same base word to create the greatest possible number and variety of clues and solutions. For example, the clue "headwear" calling for the solution "hat" can be converted to be compatible with either the solution "hat" or "hats." Alternatively, if the clue is "sombrero" both the clue and the solution can be converted so that the clue "sombreros" is created and requires the solution "hats." The same process can be used with verb-based solutions. For example, the clue "have fun" calling for the solution "play," can be harmonized to be compatible with the solutions "plays," "played," and "playing" by converting the clue to "has fun," "had fun," and "having fun," as necessary.

Figure 5:
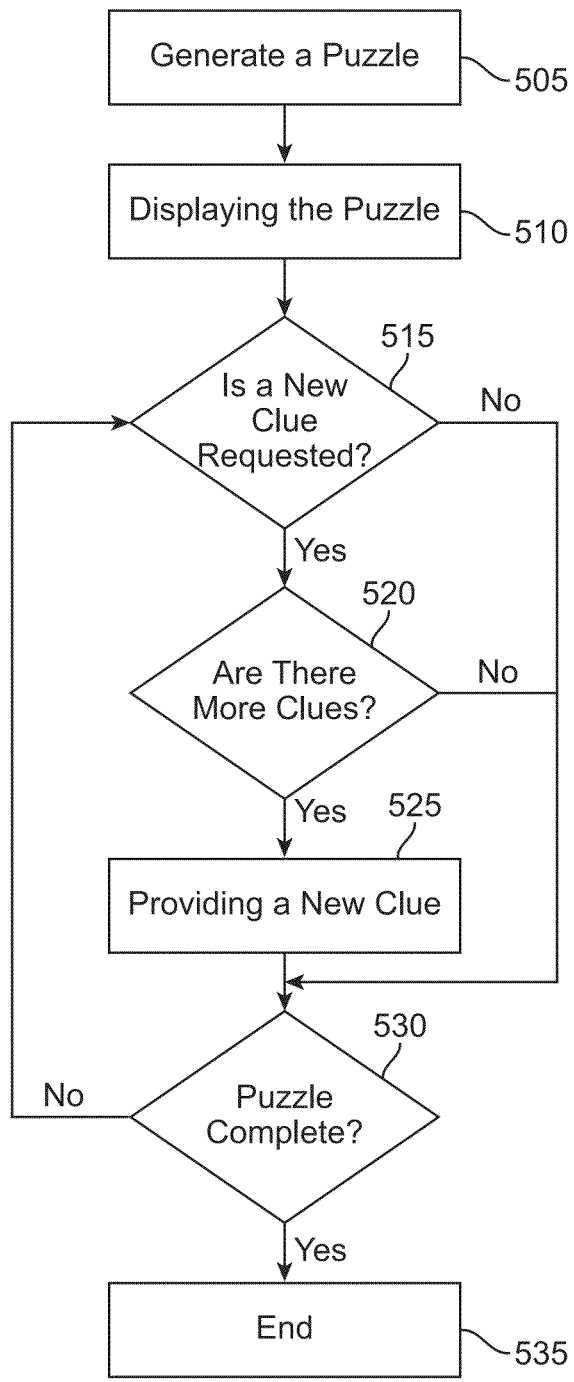
FIG. 5 illustrates an exemplary method embodiment of providing a puzzle to a user.

FIG. 5 illustrates an exemplary method embodiment of providing a puzzle to a user. At 505 a puzzle is generated. The puzzle can be generated by using data stored in a database. This data can include clues associated with solutions as well as metadata describing each. The metadata can include level of difficulty, categories, notes, links to associated data, etc. The puzzle can be generated by a processor in communication with the database and configured to search and extract data from the database.

Once generated, the puzzle can be displayed 510 to a user. The puzzle can be displayed on any computing device capable of displaying graphics. For example, the puzzle can be displayed on a computer monitor connected to a home computer or a handheld computing device such as a cellular phone, e-reader, or tablet computer. The puzzle can be displayed so that the only the clue is displayed to the user. In some embodiments visual indicators of the solution can also be displayed. For example, cells representing each letter in the solution can be displayed so that the user can determine the number of letters or characters in the solution. Once displayed, a user can attempt to solve each clue in the puzzle.

A user having difficulty arriving at a solution can request another clue 515 to the same solution (or in some embodiments select other of the puzzle improvement features discussed above). If a new clue is requested 515, the processor then determines whether any further alternate clues are available 520 for the chosen solution in the database. If another clue is available, the new clue is provided 525, if not, no clue is provided.

At 530 it is determined whether the puzzle has been completed. The puzzle can be completed in numerous ways. In some embodiments, the puzzle is completed when a user has inserted a solution for each clue. In some embodiments, the puzzle is completed by a predetermined amount of time expiring. In some embodiments, the puzzle is completed by a user electing to end the puzzle. If it is determined that the puzzle is complete, the method ends 535. If the puzzle is not complete, the method can continue to determine whether a new clue has been requested 515.

In some embodiments, a puzzle can be provided to and played by multiple puzzlers at the same time or asynchronously, either collaboratively or competitively. Multiple puzzlers can access and play the same puzzle while at various locations using the same or multiple computing devices. In some embodiments the puzzle can be accessed via a client through an online sever. In some embodiments the online sever performs remote processing and storage while the client can be an access point. For example, in some embodiments puzzlers can access a puzzle application from a social networking site. In some embodiments puzzlers can access a puzzle through a game center application. In some embodiments puzzlers can access a puzzle through a website.

In some embodiments, a group of puzzlers can create and work on the same puzzle or group of puzzles at the same time as a team. Puzzlers can log in to the same puzzles and solve clues until the puzzles are completed. In some embodiments the puzzles can be too large to finish at once or the puzzlers may not have the time to finish the puzzles in one session. In this type of embodiment, puzzlers can log in and out of the puzzles and play asynchronously as a team. Puzzlers can be scored as a team, individually, or both.

In some embodiments a puzzler or team of puzzlers can compete with another puzzler or team of puzzlers directly. For example, the same puzzle or group of puzzles can be presented to both teams and a winner can be declared based on predetermined criteria. For example, in some embodiments, a winner can be based on which team finishes the puzzles in the shortest amount of time. In some embodiments a winner can be declared based on an overall score earned by each team. Puzzlers can be scored individually or as a team.

When multiple puzzlers are playing collaboratively or competitively, user profile data can be used to handicap puzzlers to facilitate even gameplay and encourage puzzlers of all skill levels to compete against each other regardless of the skill level of their opponent. In some embodiments the final score can be adjusted based on the skill level of the puzzlers on a team. For example, a puzzler with a lower skill level can receive a set number of extra points based on the disparity between their skill level and that of their opponent. Alternatively, the points can be deducted from the puzzler with a higher skill level based on the same criteria. In some embodiments a puzzler with a lower skill level can be allotted a greater amount of time than a puzzler with a greater skill level to solve a clue without a negative impact on their score. In some embodiments a puzzler with a lower skill level can receive more points for solving a clue of a specified difficulty level than can be awarded to a puzzler with a higher skill level. In some embodiments how the puzzle is presented to a puzzler can be varied based on the skill level of the puzzler. For example, in some embodiments a puzzler can be presented with clues based on their skill level such that puzzlers with a higher skill level are presented with clues with a higher difficulty or from categories from which the puzzler has not performed as well as determined by previous user profile data, while a puzzler with a lower skill level will be presented with clues with a lower difficulty level or from categories which the puzzler has performed well in the past or has identified as categories of interest. In some embodiments the improvement features offered to a puzzler can be limited based on their skill level such that a puzzler with a higher skill level has few, if any, improvement features available while a puzzler with a low skill level has most, if not all, improvement features available. In some embodiments the effectiveness of an individual improvement feature can be varied based on the skill level of a puzzler. For example, in some embodiments a puzzler with a higher skill level can only be presented with a letter from the middle of a word when using the EVEN ONE LETTER improvement feature while a puzzler with a lower skill level can be presented with the first letter which is considered a more effective hint.

Figure 6:
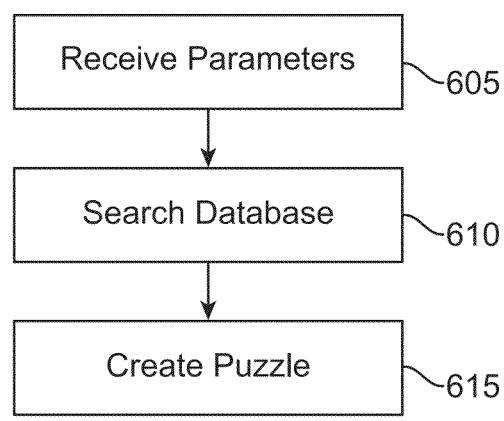
FIG. 6 illustrates an exemplary method of creating a puzzle customized by a user.

FIG. 6 illustrates an exemplary method of creating a puzzle customized by a user. At step 605 parameters are received at the server. The parameters can be any parameters used to define the scope of the puzzle. Parameters can include puzzle size, number of solutions, level of difficulty, number of alternate clues, categories, etc. For example, a user can set the parameters for a puzzle to 20 solutions with only clues over a difficulty level of 4 and in the sports and music category. In addition to picking parameters, the user can also define priority for the selected parameters in case creating a puzzle with the exact combination of selected variables is not possible. Once the parameters have been received 605, the database is searched 610 for clues and solutions matching the defined parameters. If not enough matches are found, the remaining solutions can be chosen taking into account the priority values defined by the user. For example, a user can select as parameters (1) 10 solutions included in the puzzle, (2) each associated with clues with a difficulty rating over 4, (3) in the sports category, and (4) with priority given to clues within the sports category over those having a clue with a difficulty rating over 4. If upon searching, only 9 solutions were found matching those parameters, the system can choose a $10^{th}$ solution from the sports category with a difficulty rating under 4 (if available) rather than one with a difficulty rating over 4 but from a different category. Once all the data is chosen, the puzzle is created 615.

Figure 7:
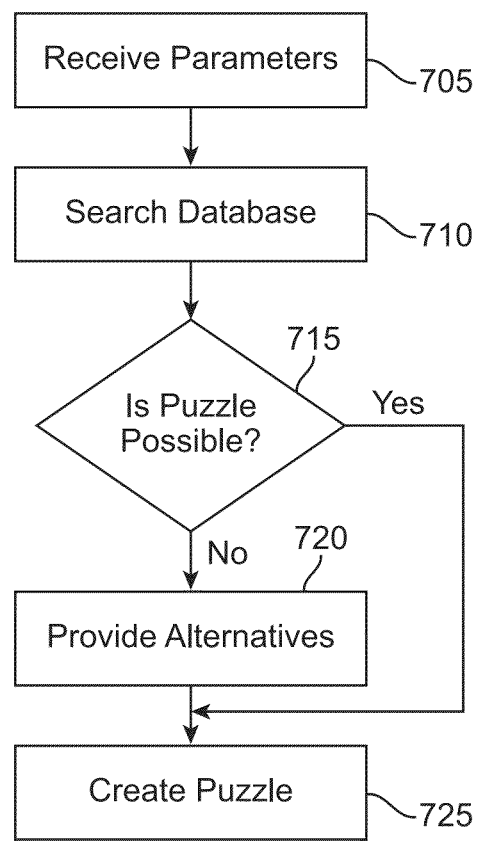
FIG. 7 illustrates another exemplary method of creating a puzzle customized by a user.

FIG. 7 illustrates another exemplary method of creating a puzzle customized by a user. At 705 parameters entered by the user are received and at 710 the database is searched for clues and solutions matching the entered parameters. If enough clues and solutions are received 715, then the puzzle is created 725. If, however, it is determined that there are not enough clues and answers to create the puzzle based on the entered parameters 715, the user is prompted with possible solutions 720. For example, in some embodiments the system can determine possible changes to the entered parameters which will result in a puzzle being created. These changes can be based on the entered parameters to keep the parameters as close to the chosen parameters as possible. For example, if a user selects to have only clues with a difficulty level over 3, the system can suggest changing it to clues with a difficulty level over 2, if the change will result in a puzzle being created. Multiple options can be presented to the user. Once a selection is made, the puzzle is created. In some embodiments, the puzzle is created close to the original parameters, by including all clues and solutions exactly matching the user's original parameters, and only filling in the rest with those within the modified parameters.

Figure 8:
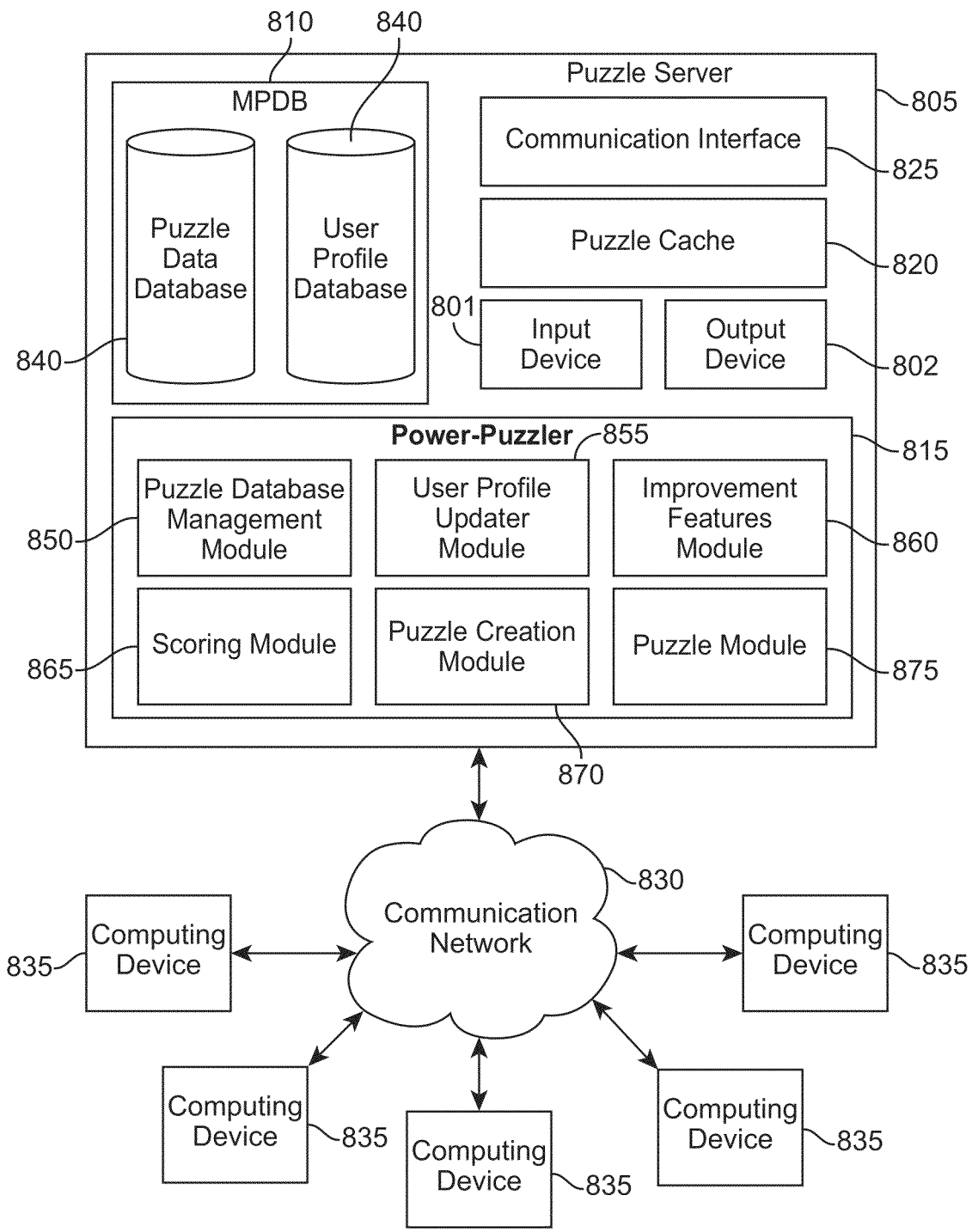
FIG. 8 illustrates an exemplary system embodiment of the puzzle server.

FIG. 8. Illustrates an exemplary embodiment of the puzzle server. As illustrated, the puzzle server can include a master puzzler database (MPDB) 810, a power puzzler application 815, a puzzle cache 820 communication interface 825, input device 801 and output device 802. The input device 801 can be any type of input device configured to work with a computing device such as a keyboard, mouse, touchpad, microphone, etc. The output device 802 can be any type of output device configured to work with a computing system such as a monitor, touchscreen, speakers, etc. The communication interface 825 can be configured to communicate with multiple computing devices 835 through use of a communication network 830.

The MPDB 810 can consist of multiple databases. In some embodiments, the MPDB 810 includes a puzzle database 840 and a user profile database 845. The puzzle database 840 can be used to store puzzle data including clues and solutions as well as metadata associated with the clues and solutions. The user profile database 845 can be used to store user profile data regarding a puzzler. This data can include personal data including demographic information about the puzzler such as name, age, sex, educational background, occupation, geographical residences etc., as well as preference information such as the puzzler's likes and dislikes. The user profile database 845 can also store data regarding a puzzler's performance solving puzzles, such as number of puzzles solved, time taken to solve puzzles, difficulty level of clues, percentage of solutions entered correctly, etc.

The power-puzzler application 815 can be configured to interact with the MPDB 810 to create and provide interactive puzzles to puzzlers. The power-puzzler application 815 can consist of multiple modules. As illustrated, the power-puzzle application 825 can consist of a puzzle database management module 850, a user profile updater module 855, improvement features module 860, scoring module 865, puzzle creation module 870 and a puzzle module 875.

The puzzle database management module 850 can be configured to interact with the puzzle database 840 to add and organize puzzle data in the puzzle database 840. The puzzle database management module 850 can be configured to receive puzzle data through an input device 801 or the communication interface 805. Once the data is received, the puzzle database management module 850 can store the puzzle data in the puzzle database 840. Each clue and its solution can be stored in the puzzle data base 840 as independent but related elements. The puzzle database management module 850 can also be configured to match solutions stored in the database with all clues to which the solution can be properly derived from the clue, thus resulting in multiple clues being associated with a single solution. In some embodiments, the puzzle database management module 850 can achieve this by comparing each solution to each other and combining any identical solutions. In some embodiments, the puzzle database management system 850 can be configured to compare a newly received solution as it is being entered against the solutions already present in the puzzle data database 840. If a match is found, a new clue can be added to the puzzle database 840 and related to the already existing solution entry.

Additionally, the puzzle database management system 850 can be configured to create a greater number and variety of clues and solutions within the puzzle data database 840 by "harmonizing" the puzzle data. Harmonizing can include converting clues and solutions to fit with multiple forms of the same base word, to the extent possible. For example, the clue "headwear" calling for the solution "hat" can be converted to be compatible with either the solution "hat" or "hats." Alternatively, if the clue is "sombrero" both the clue and the solution can be converted so that the clue "sombreros" is created and requires the solution "hats." The same process can be used with verb-based solutions. For example, the clue "have fun" calling for the solution "play," can be harmonized to be compatible with the solutions "plays," "played," and "playing" by converting the clue to "has fun," "had fun," and "having fun," as necessary. In some embodiments the puzzle database management system 850 can accomplish this by identifying root words and then referencing them against a word database to identify alternate forms. In some embodiments, the database management system can be configured to harmonize the puzzle data with foreign language dictionaries so that a clue or solution can be converted into a different language.

The user profile updater module 855 can be configured to collect user profile data and interact with the user profile database 845 to store the profile data in the user profile database 845. The user profile update module 855 can collect user profile data about a puzzler, such as name, age, sex, educational background, occupation, history of geographic residences, preferences, etc. In some embodiments the user profile data can be entered by a user through use of an input device 801. In some embodiments the user profile data can be received from a computing device 835 over the communication network 830 using the communication interface 825. In addition to personal profile data, the user profile update module 855 can also gather data regarding a puzzler's performance solving puzzles, such as number of puzzles solved, time taken to solve puzzles, difficulty level of clues, percentage of solutions entered correctly, etc. Once profile data is gathered, the user profile update module 855 can update a puzzler's user profile data stored in the user profile database 840, or, if one does not already exist, create a user profile for the puzzler in the user profile database 845 and store the data.

The puzzle creation module 870 can be configured to create puzzles. The puzzle creation module 870 can be configured to interact with the puzzle database 840 and the user profile database 845 as well as receive input from the communication interface 825 or the input device 801. The puzzle creation module 870 can be configured to create puzzles based on puzzle parameters. Puzzle parameters can include any type of parameter that can be used in defining the scope of the puzzle. For example, puzzle parameters can include the number of clues and solutions, the difficulty level of clues, categories of the clues, etc. The puzzle creation module 870 can search the puzzle database 840 for clues and solutions conforming to the puzzle parameters. In some embodiments the puzzle parameters are set for a standard puzzle. In some embodiments the puzzler can choose between several choices of puzzles such as easy, medium and hard and the parameters will be preset based on the puzzler's selection. In some embodiments the puzzler can fully customize a puzzle by entering specific parameters such as the exact number of solutions, the difficulty level range for clues, and categories of clues. Parameters can be received through the input device 801 or the communication interface 825. Once the clues and solutions have been chosen from the puzzle database 840, the puzzle creation module 870 can create the puzzles using any known puzzle creation algorithm. The puzzle creation module 870 can store created puzzles in the puzzle cache 820.

The puzzle creation module 870 can also create puzzles based on puzzle parameters which are tailored to a unique puzzler. For example, in some embodiments, a puzzler can set a puzzle parameter to create a puzzle to be solved within 30 minutes. The time for a puzzle to be solved varies based on many factors such as a puzzler's skill level and knowledge level in particular categories. The puzzle creation module 870 can be configured to use profile data stored about a specific puzzler to approximate parameters to create a puzzle conforming to the puzzlers given time frame. For example, the data in the puzzler's user profile can include the time taken for the puzzler to solve clues of different difficulty levels and in different categories. Based on these statistics, the puzzle creation module 870 can determine parameters to create a puzzle to be completed in the given time frame. For example, the data in the user profile can indicate that a puzzler, on average, completes clues with a difficulty level of 3 or under in 3 minutes and clues with a difficulty level over 3 in 7 minutes. Based on this user profile data, the puzzle creation module 870 can choose 3 clues with a difficulty level over 3 and 3 clues with a difficulty of 3 or under to create the puzzle that should take the puzzler 30 minutes to complete.

The puzzle creation module 870 can also be configured to create a puzzle when creating a puzzle complying exactly with the given parameters is not possible. In some embodiments the puzzle creation module can choose clues and answers not complying with the parameters based on priority values assigned to the parameters so that the created puzzle complies to the chosen parameters first and then to the assigned priority values. The priority values can be received from a puzzler via the input device 801 or the communication interface 825. In some embodiments the puzzle creation module 870 can determine changes to the parameters that would result in a puzzle being created. In some embodiments, these changes to the parameters can be presented to the puzzler for approval. In some embodiments the changes can be determined to be as close to the original parameters as possible. In some embodiments multiple possible changes can be determined and presented to the puzzler for the puzzler to select. The changes chosen can then be used to create the puzzle.

The puzzle module 875 can be configured to provide a graphical interface puzzle game to puzzlers in which a puzzler can view a puzzle as well as enter solutions. In some embodiments the puzzle can be played on the puzzle server 805 and so the puzzle can be output via the output device 802 and a puzzler's input can be received via the input device 802. In some embodiments a puzzler can play the puzzle from their remote computing device 835 and so the puzzle module can output puzzles via the communication interface to be sent to the computing device 835 via the communication network 830. Puzzler input can also be received from the computing device 835 by the communication interface 825 via the communication network 830. In some embodiments, the puzzle can be played by multiple puzzlers and can be provided at multiple computing devices 835 via the communication network 830. For example, the puzzle can be accessed from the puzzle server 805 by puzzlers through a social networking site. In addition to offering the puzzle, the puzzle module can also be configured to allow a puzzler to request different clues corresponding to the same solution. Upon receiving a request, the puzzle module will provide a new clue which corresponds to the same solution. In some embodiments the puzzle module can be configured to interact with the puzzle database 840 to retrieve new clues. In some embodiments the puzzle creation module 870 stores all additional clues associated with the solutions in the puzzle cache 820 when creating the puzzle and the puzzle module 875 can retrieve the additional clues without interacting with the puzzle data database 840. The puzzle module 875 can also be configured to interact with the improvement features module 860 and the scoring module 865.

The improvement features module 860 can be configured to apply any of the improvement features to a puzzle being provided by the puzzle module 875. In some embodiments the puzzle module 875 receives input from the puzzler to invoke an improvement feature and then communicates the request to the improvement features module 860 which implements the requested feature. In some embodiments a puzzler's input directly requests the puzzle feature from the improvement features module 860.

The scoring module 865 can be configured to receive information from the puzzle module in calculating a score. In some embodiments the scoring module can receive input to configure how the score is calculated. In some embodiments the scoring module can calculate a score based on a default scoring calculation. The scoring module can also be configured to communicate with the user profile database to store data concerning a puzzler's performance in the user profile database. This data can include the calculated score as well as performance data used in calculating the score.

In some embodiments, advertisements can be presented to puzzlers in association with a puzzle. Advertisements can be provided by an advertising server that can select and provide advertisements on the basis of the puzzlers profile or on the basis of puzzle clues or solutions, as well as other factors. The advertising server can work in cooperation with the puzzle server which can request the advertisement, or the advertising server can work in cooperation with the user device, which can request the advertisement. In some embodiments, the puzzle application on the client device can request an advertisement either directly from the advertisement server or through the puzzle server.

In addition to providing improvement features that make puzzles easier to solve, power-puzzler 815 can also be configured to present puzzles in a way that makes them easier to play. For example, computing devices 835 such as mobile phones can have limited screen space and thus viewing the puzzle grid and the clues as well as navigating between the clues and solution cells can be difficult. Accordingly, power-puzzler 815 can be configured to provide features that make viewing a puzzle, navigating between clues/solutions, and entering input easier for a puzzler.

To accomplish this, in some embodiments, power-puzzler 815 can be configured to provide a custom input interface that minimizes the amount of space utilized to receive input as well as maximizes ease of input for a puzzler. For example, the puzzle module 875 can be configured to display a custom keyboard that enables a puzzler to enter solutions into solution cells. The puzzle module 875 can be configured to present the custom keyboard in numerous ways to reduce space used by the keyboard as well as minimize obstruction of the puzzle while still providing for easy input by a puzzler.

In some embodiments, the puzzle module 875 can present the custom keyboard in various shapes, such as a circle, rectangle, square, triangle, etc., to minimize the space used by the keyboard and minimize obstruction of the puzzle. In some embodiments, the shape of the custom keyboard can always be the same shape, such as a circle, rectangle, etc. In some embodiments, however, the shape of the keyboard can be variable based upon available space on the screen. The puzzle module 875 can be configured to evaluate the puzzle displayed on the screen and determine which shape of keyboard provides the least obstruction of the puzzle while still providing adequate size for a puzzler to comfortably input using the keyboard.

To accomplish this, in some embodiments, the puzzle module 875 can be configured to evaluate the display of the puzzle on the screen to identify potential areas to place the keyboard. For example, the puzzle module 875 can be configured to identify the coordinates of the edges of unused spaces on the screen and use the coordinates to identify a shape of the unused space. Unused space can be space that is not used by the puzzle, such as space that does not contain puzzle cells or clues. The coordinates of the edges can be analyzed to determine the area of the unused space as well as a shape of the unused space. Based on these calculations, the puzzle module 875 can select a shape of keyboard best suited for the unused space. The puzzle module can select from available unused spaces based upon the calculated area of the unused spaces. For example, the puzzle module 875 can select the unused space that allows the greatest area for the keyboard. In some embodiments, the different keyboard shapes can be ranked or weighted based upon a predetermined preference, and the shape of keyboard that fits the unused space can be considered in addition to the area of the unused space in selecting a keyboard shape.

In some embodiments, each shape keyboard can have a set minimum size in which it can be displayed and, if none of the unused spaces are large enough to accommodate any of the keyboards, the puzzle module 875 can be configured to determine the best suitable space for the keyboard that includes used space. Used space can be space that includes information used by the puzzle such as puzzle cells and clues. The puzzle module 875 can be configured to evaluate the used spaces to determine an optimal area for the keyboard that would provide the least intrusive obstruction for the puzzler. For example, the puzzle module 875 can be configured to take into consideration multiple factors in deciding the optimal area for the keyboards. These multiple factors can include the calculated area of obstruction of used space, the importance of the used space obstructed, the shape of the keyboard that can be placed into the space, etc.

In some embodiments, the puzzle module 875 can be configured to enable a puzzler to modify the keyboard to avoid obstruction. For example, the puzzle module 875 can be configured to enable a user to select a shape of the keyboard, change the size of the keyboard and move the keyboard. In some embodiments, the puzzle module 875 can be configured to provide user interface elements such as buttons, check boxes, scroll bars, etc., configured to enable a puzzler to select a keyboard shape, move the keyboard and alter the size of the keyboard.

In some embodiments, the puzzle module 875 can enable a puzzler to make the selections using gestures on a touch interface screen. For example, the puzzle module 875 can be configured to enable a user to drag the keyboard to move it, pinch to change the size and swipe to change the shape. These are just some examples and are not meant to be limiting. The present disclosure recognizes that the puzzle module 875 can be configured to receive input in any number of ways known in the art.

In addition to changing the size and shape of the keyboard, the puzzle module 875 can also be configured to place the available input options, such as letters, at positions within the keyboard that make the keyboard easier to use by a puzzler. For example, the letters of the keyboard can be placed in positions determined to be optimal for a puzzler to input solutions. Determining the position for each letter can be done in numerous ways. In some embodiments, the available positions on the keyboard can be ranked based upon a determined ease of selection at the position by a puzzler. Further the letters can be ranked based upon a determined importance of each letter and the letters can be placed in the positions based upon the ranking of both the position and the letter. For example, letters can be placed in positions on the keyboard based on how commonly the letters occur in words such that the letters that most commonly appear in words can be placed in the positions determined to be the easiest to select by a puzzler while the least common letters can be placed in the positions determined to be the most difficult to select by a puzzler.

In some embodiments, data indicating which letters are most commonly used can be based upon national statistics received from a third party. In some embodiments, the data indicating which letters are most commonly used can be based upon statistics gathered by power-puzzler 815 from puzzlers. For example, data regarding puzzler input can be gathered and stored in the MPDB 810 and used to calculate the letters used most commonly by puzzlers. In some embodiments, the data regarding puzzler input can be data gathered from the population of puzzlers and the order of letters most commonly used can indicate the letters most commonly used by the population of puzzlers using power-puzzler.

In some embodiments, however, the order of the letters most commonly used can be based on data gathered from a specific puzzler and thus the order would indicate the letters most commonly used by the specific puzzler. In this type of embodiment, the keyboard presented to the puzzler can be customized to the specific puzzler based on data gathered about the specific puzzler.

The positions on the keyboard determined to be easiest to access can be based on a predetermined ranking or based on data collected from puzzlers. In some embodiments, data collected from puzzlers can be analyzed to identify which positions result in correct selection of a letter. For example, input that a puzzler selected the letter as a re-entry to a previously inserted letter that was deleted can indicate that the puzzler was attempting to type the letter at the final position but accidentally selected a letter at another position. Thus, the number of re-entries associated with a position can be used to rank which positions are the easiest and hardest for a user to select. The position associated with the most re-entries can be determined to be the hardest to select, while the positions associated with the fewest re-entries can be determined to be the easiest to select.

In some embodiments, the speed at which a puzzler makes a selection at a position can also be used to determine which positions are the easiest to select. For example, the time between selections at different positions can be tracked and used to calculate an average speed at which a puzzler is able to select a letter at each position. The position with the lowest calculated average time to select can be determined to be the easiest position to select, while the position with the highest calculated average time to select can be determined to be the hardest position to select.

In addition to providing keyboards of different shapes and sizes, in some embodiments, the puzzle module 875 can be configured to present only a subset of the available letters at one time. For example, only 5 letters can be presented at one time and the puzzler can scroll between different groups of letters. In some embodiments, the subset can be just a single letter. For example, the puzzle module 875 can be configured to present one letter in a selected cell and a puzzler can scroll through the letters. For example, the puzzler can swipe to scroll through the alphabet. In some embodiments, the letters can be presented in order of most common to least common.

In some embodiments, the subset of letters can appear upon a puzzler selecting a puzzle solution cell in which to enter a letter. Upon the puzzler selecting the solution cell, the subset of letters can be presented for the puzzler to make a selection.

Figure 9:
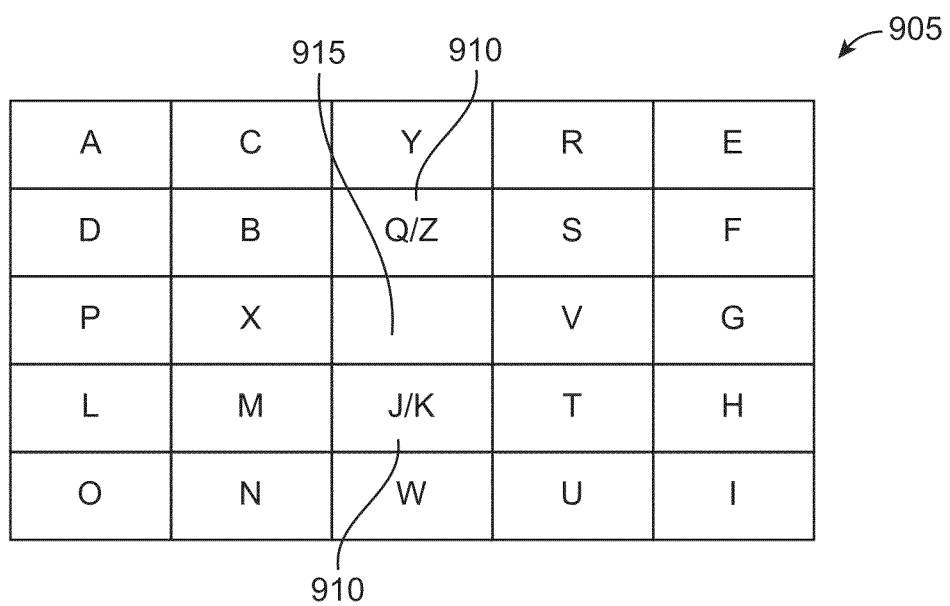
FIG. 9 illustrates a screenshot of an exemplary embodiment of a keyboard.

FIG. 9 illustrates a screenshot of an exemplary embodiment of a keyboard 905. As illustrated, the keyboard 905 is a rectangular shape and consists of numerous cells. The majority of the cells include a letter associated with the cell, however two cells 910 contain multiple letters and one cell 915 contains no letter. The exemplary keyboard is configured to place common letters in positions which are easiest for a puzzler to select. For example, the corner locations which only border other cells on two sides can be considered the easiest to select because there is less chance of a puzzler accidentally selecting another cell. As illustrated the vowels 'A' 'E' 'O' and 'I' are placed in these corner cells because vowels are very common letters. Further, the remaining edge pieces can be considered to be easier to access because they only share three borders with other cells. Those cells can contain other common letters.

As illustrated, two cells contain multiple letters 910. Combining cells with multiple letters can reduce the overall size of the keyboard and result in less obstruction of the puzzle. The least common letters can be placed in these cells 910. In some embodiments, the puzzler can tap the cell 910 once to type the first letter displayed and double tap the cell 910 to select the second letter. The most uncommon letters can be positioned as the second letter in these shared cells 910. Thus, a puzzler would only have to tap twice to select the most uncommon letters and the need for a puzzler to make the two taps to select only one letter can be minimized to these rare situations, whereas the puzzler would only have to make one tap to select any other letter.

The center cell 915 with no letter can be used in numerous ways. In some embodiments, the cell 915 without a letter can represent a space. In some embodiments, the cell 915 with no letter can be used to drag the keyboard to a different location. In some embodiments, the cell 915 with no letter can be used to toggle between different options such as different letters presented in the cells, different shapes of the keyboard, etc.

Figure 10:
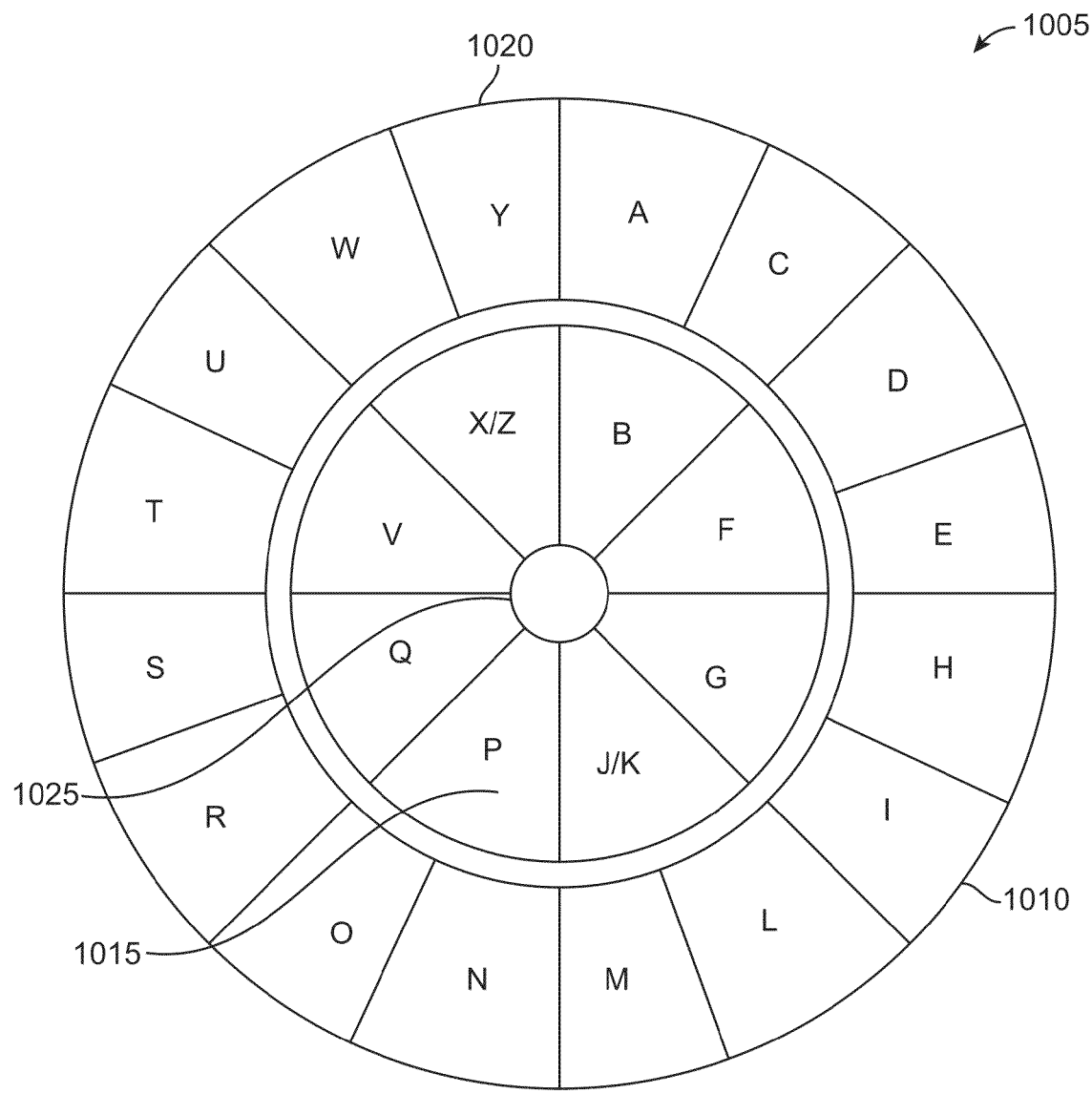
FIG. 10 illustrates a second exemplary keyboard embodiment.

FIG. 10 illustrates a second exemplary keyboard embodiment. As illustrated, the keyboard 1005 is circular and letters are placed in cells. The cells are arranged in two concentric circles, an outer circle 1010 and an inner circle 1015. The location of the letters can be based upon how common the letters are. For example, the more common letters can be placed in the outer circle 1010 while the less common letters can be placed in the inner circle 1015. In some embodiments, the keyboard 1005 can be configured so that a puzzler can select a letter by pressing the cell including the letter.

In some embodiments, the keyboard 1005 can be configured to rotate to select a letter. For example, one unchanging position along the circle can be considered to be a selection position and the letter rotated into that selection position can be the letter selected to be entered. For example, the top position of the keyboard 1020 can be the selection position and the letter placed at the top 1020 can be the letter selected. A puzzler can thus rotate the wheel to put the desired letter into the selection position for selection. In some embodiments, the selection position can be marked to indicate that it is the selection position. For example the selection position can be marked by symbol such as a line or arrow. Alternatively the selection position can be marked by the way the content of the position is presented, such as by presenting the letter in the selection position in a different color.

In some embodiments, the keyboard can be configured to enter the letter in the selection position upon a puzzler selecting a button. For example, the puzzler can press the middle button 1025 to make the selection. In some embodiments, the selection can change the solution cell to the next cell in the solution.

In some embodiments the two circles 1010, 1015 can be selected individually and then rotated. In some embodiments, the direction that a puzzler rotates the keyboard can dictate which of the two circles will spin. For example, moving the keyboard in a counter-clockwise motion can rotate the outer circle 1010 and moving the keyboard in a clockwise motion can rotate the inner wheel 1015.

The puzzle module 875 can be further configured to display clues and their corresponding solution cells in a manner that increases visibility and ease of playability of the puzzle. For example, in some embodiments, the puzzle module can be configured to expand a selected portion of the puzzle so that a puzzler can easily view the selected portion of the puzzle. Further, the puzzle module 875 can be configured to remove clues or puzzle cells that are not relevant to the clue or solution selected by the puzzler. This can create space as well as remove the distraction of unnecessary portions of the puzzle.

Figure 11A:
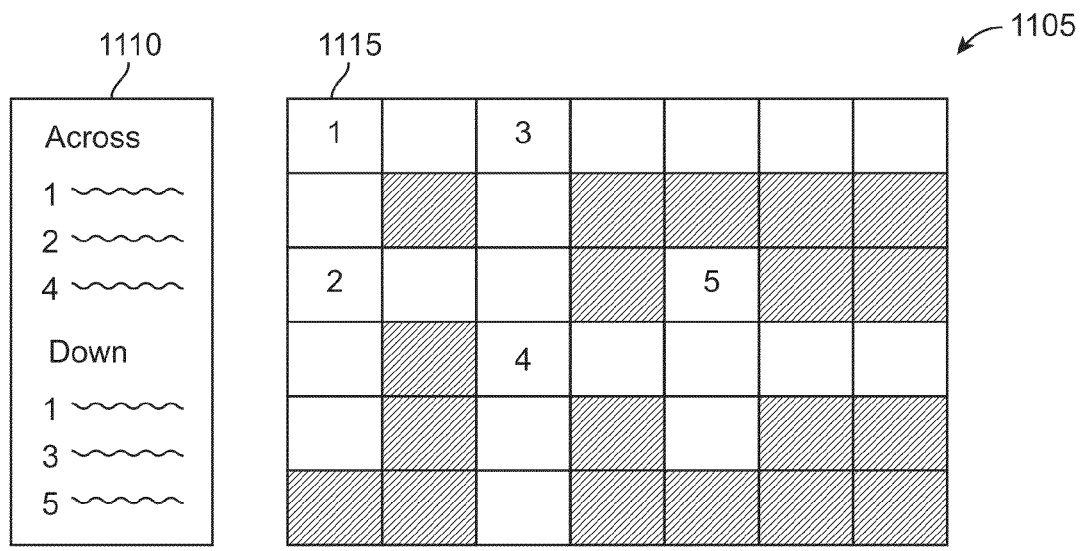
FIGS. 11a-11d illustrate screenshots of an exemplary computer generated puzzle.

FIGS. 11*a*-11*d* illustrate screenshots of an exemplary computer generated puzzle. As illustrated in FIG. 11*a*, the entire puzzle 1105 is presented to the puzzler as well as clues 1110. A puzzler can select to work on a solution by selecting a clue or a cell of one of the solutions in the puzzle.

Figure 11B:
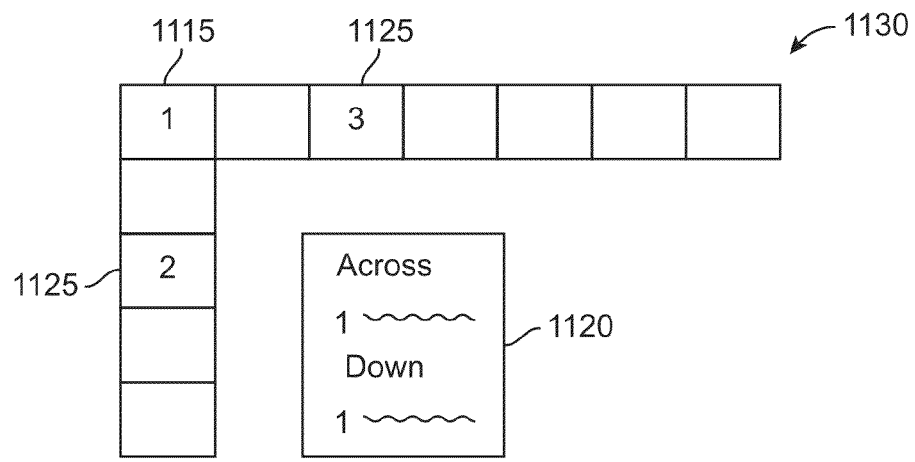

FIG. 11*b* illustrates an exemplary screenshot of the resulting output upon a puzzler selecting the clue for 1 across 1115. As illustrated, two solutions that intersect at the selected solution cell have been enlarged and all other portions of the puzzle have been removed from the screen. Further, only the clues 1120 for the enlarged solutions are displayed. Thus, a puzzler can easily view the clues 1120 and corresponding solution cells. Additionally, the position of other solutions that intersect the displayed solution but are not fully displayed are indicated by the number of the corresponding clue 1125. For example, the number 3 represents that 3 down intersects 1 across at the indicated cell. Further, the number 2 indicates that 2 across intersects 1 down at the indicated cell.

Further, a user interface element button 1130 is included that enables the puzzler to return to the full puzzle 1105 displayed in FIG. 11*a*. Upon selection of the user interface element button 1130, the enlarged view of the selected solutions can be replaced with the full puzzle 1105 displayed in FIG. 11*a*.

In some embodiments, the puzzle can be configured to allow a puzzler to easily navigate through the available solutions and clues from the expanded view presented in FIG. 11*b*. For example, the puzzle can be configured such that a puzzler can select another solution intersecting with the displayed solution to change the display to the selected solution. For example, as illustrated, 1 across intersects with 3 down and 1 down intersects with 2 across. To view the clue and solution for 3 down, the puzzler can select the solution cell that indicates the intersection of 1 across and 3 down.

Figure 11C:
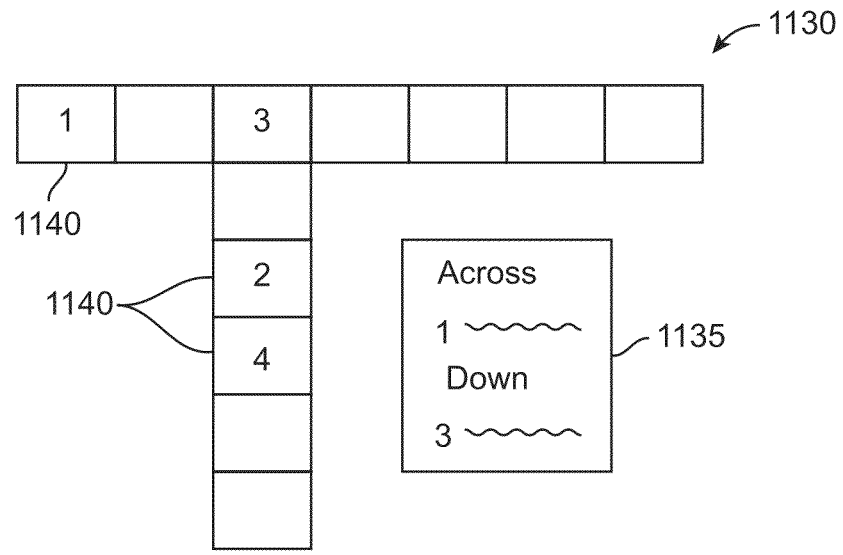

FIG. 11*c* illustrates an exemplary screen shot upon the puzzler selecting the 3 down cell displayed in FIG. 11*b*. As illustrated, the solution 1 down has been removed and the solution for 3 down is displayed. Further, the clues 1135 for the two presented solutions, 1 across and 3 down are both displayed.

Further, indicators 1140 are displayed representing where the displayed solutions intersect with solutions that are not fully displayed. As illustrated, the number 2 indicates where 3 down intersects with 2 across and the number 4 indicates where 3 down intersects with 4 across.

As illustrated, 1 down and 1 across intersect at the same point and thus it can be unclear that the number indicating one across also indicates 1 down. To further clarify the puzzle, in some embodiments, the cells can be color coordinated to aid in the differentiation of the cells. For example, cells that represent an across solution can be presented in a first color and the cells representing a down solution can be presented in a second color that is different than the first color to represent the distinction. Intersecting cells that are part of both an across and down solution can be represented in a third color different than the first and second color. Thus, the illustrated solution cell where 1 across and 1 down intersect can be displayed in a color indicating that 2 solutions intersect at the cell. Further, the clues can be presented in the color matching the solution. Thus, all across clues can be presented in the same color as the across solutions and all down clues can be presented in the same color as the down solutions. In some embodiments, each solution and corresponding clue can be presented in a unique color from each other solution and its corresponding clue.

Figure 11D:
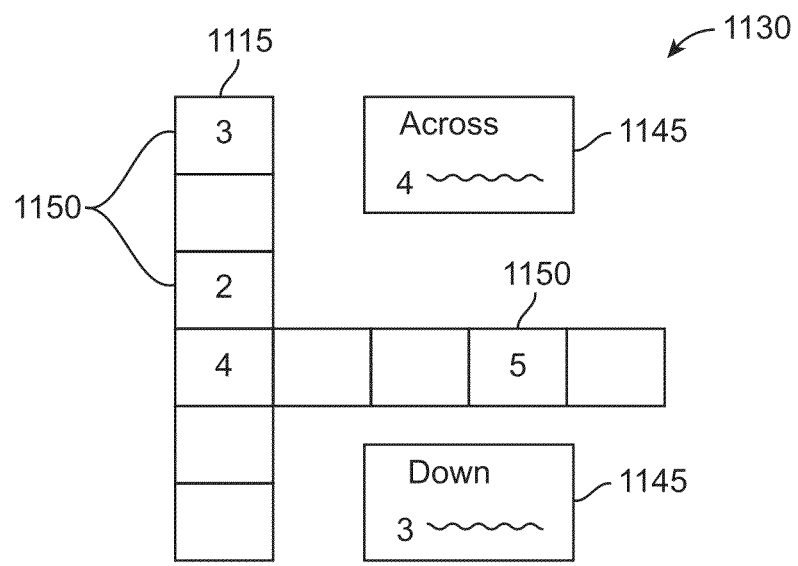

FIG. 11*d* illustrates an exemplary screenshot upon a puzzler selecting the cell indicating the intersection of 3 down and 4 across displayed in FIG. 11*c*. As illustrated, 1 across is no longer displayed and 4 across is displayed. Further, the clues 1145 corresponding to the displayed solutions are presented. As illustrated, the clues 1145 have been rearranged to take advantage of the unused space presented on the screen. Finally, indicators 1150 representing the intersecting solutions are presented.

Figure 12:
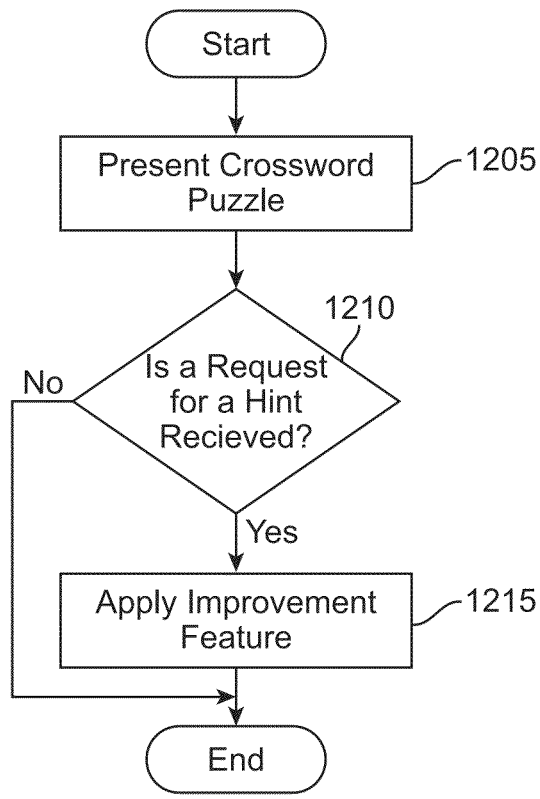
FIG. 12 illustrates an exemplary method embodiment of presenting a hint to a lengthy solution.

FIG. 12 illustrates an exemplary method embodiment of presenting a hint to a lengthy solution. As illustrated, the method begins at block 1205 where a computer generated crossword puzzle can be presented to a user. The crossword puzzle can consist of multiple sets of solution cells and multiple clues. Each clue can be associated with one of the sets of solution cells. Each cell within a set of solution cells can represent one letter in the solution to the corresponding clue. Some of the solutions can be lengthy, for example consisting of ten or more letters.

The method continues to 1210 where it is determined whether a request for a hint to a length solution is received. If a request for a hint is received, the method continues to block 1215 where an improvement feature providing at least one hint to the lengthy solution is applied to the computer generated crossword puzzle.

Figure 13:
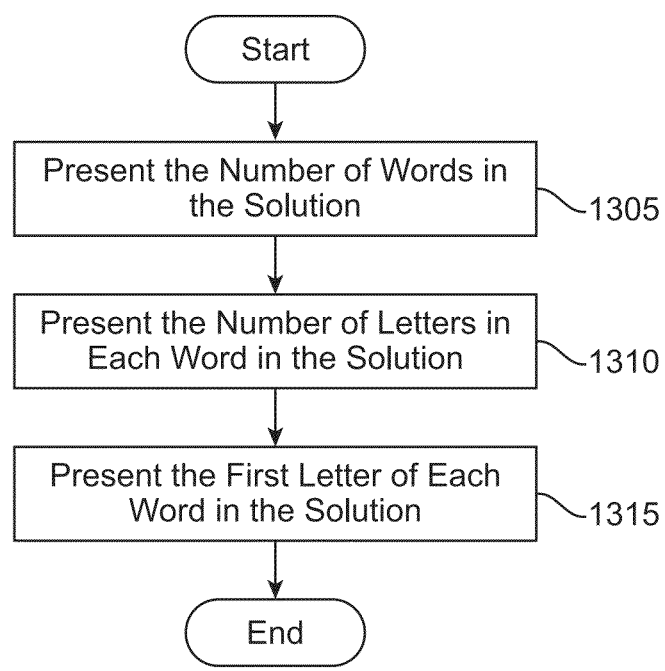
FIG. 13 illustrates an exemplary method embodiment of applying an improvement feature that includes at least one hint to a lengthy solution.

FIG. 13 illustrates an exemplary method embodiment of applying an improvement feature that includes at least one hint to a lengthy solution. As illustrated, the method begins at block 1305 where the number of words in the solution is presented to the puzzler. The method continues to block 1310 where the number of letters in each word in the solution is presented in the puzzler. Finally, at block 1315 the first letter of each word in the solution is presented to the puzzler. In some embodiments, the first letter to each word in the lengthy solution is presented within the corresponding solution cell of the first letter of each word. Thus the puzzler can be presented with the solution with the first letter of each word already entered.

Figure 14:
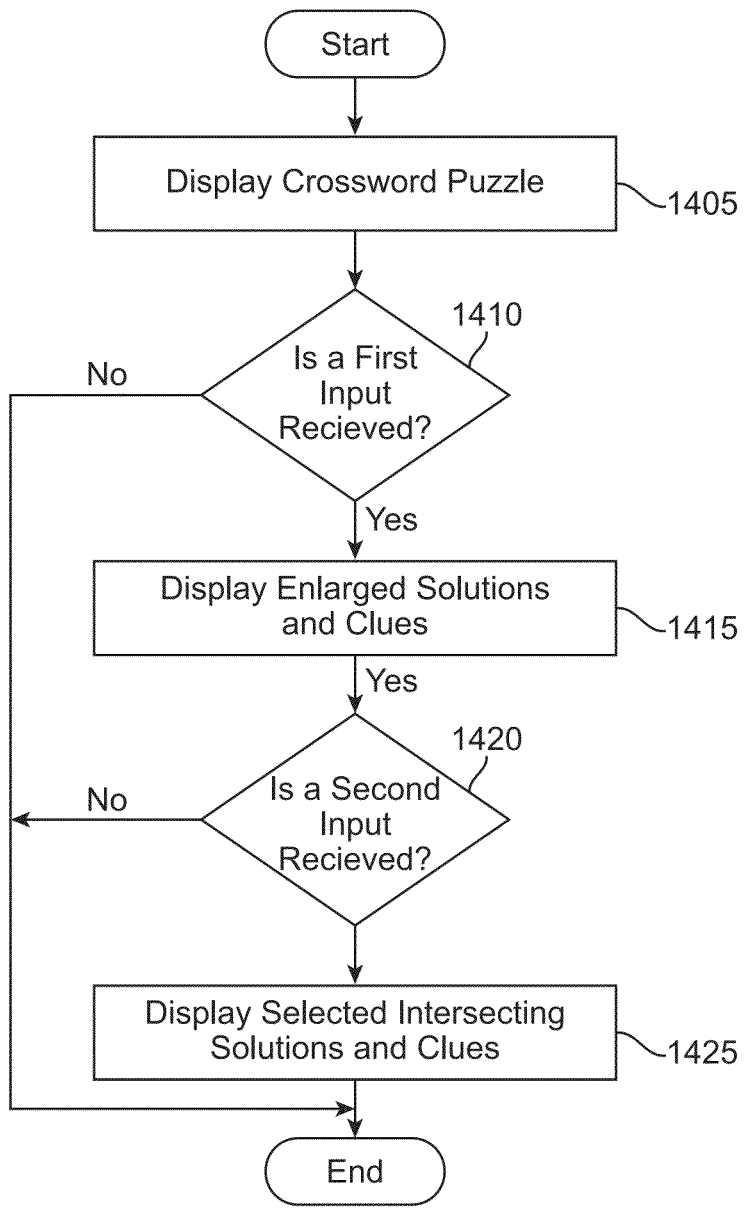
FIG. 14 illustrates an exemplary method embodiment of displaying a computer generated crossword puzzle.

FIG. 14 illustrates an exemplary method embodiment of displaying a computer generated crossword puzzle. As illustrated, the method begins at block 1405 where a computer generated crossword puzzle is displayed. The crossword can include clues and corresponding sets of solution cells. Each clue and set of solution cells can be configured to receive an input from a puzzler.

At block 1410 the method determines whether a first input has been received. The first input can be received at a clue or solution cell and can indicate a specific clue and corresponding set of solution cells that the puzzler wishes to focus on. If at block 1410 an input is received, the method continues to block 1415 where the selected clue and corresponding set of solution cells is enlarged and presented to the puzzler. In addition, a second set of solutions cells that intersects with the selected set of solution cells can also be enlarged and presented along with its corresponding clue.

In some embodiments, the second set of solution cells selected can be indicated by the first input received from the puzzler. For example, if the first input was the result of the puzzler selecting a solution cell where two sets of solution cells intersect, the two sets of solutions cells that intersect along with their corresponding clues will be enlarged and presented to the user. Further, in some embodiments, the other portions of the puzzle can be removed or dimmed and presented in the background.

The method then continues to block 1420 where it is determined whether a second input is received. The second input can be received by a puzzler selecting a solution cell presented within the two enlarged sets of solution cells that indicates that another set of solution cells intersects the displayed solution cell.

If a second input is received, the method continues to block 1425 where the two sets of solution cells indicated by the second input are enlarged and displayed along with their corresponding clues.

Figure 15:
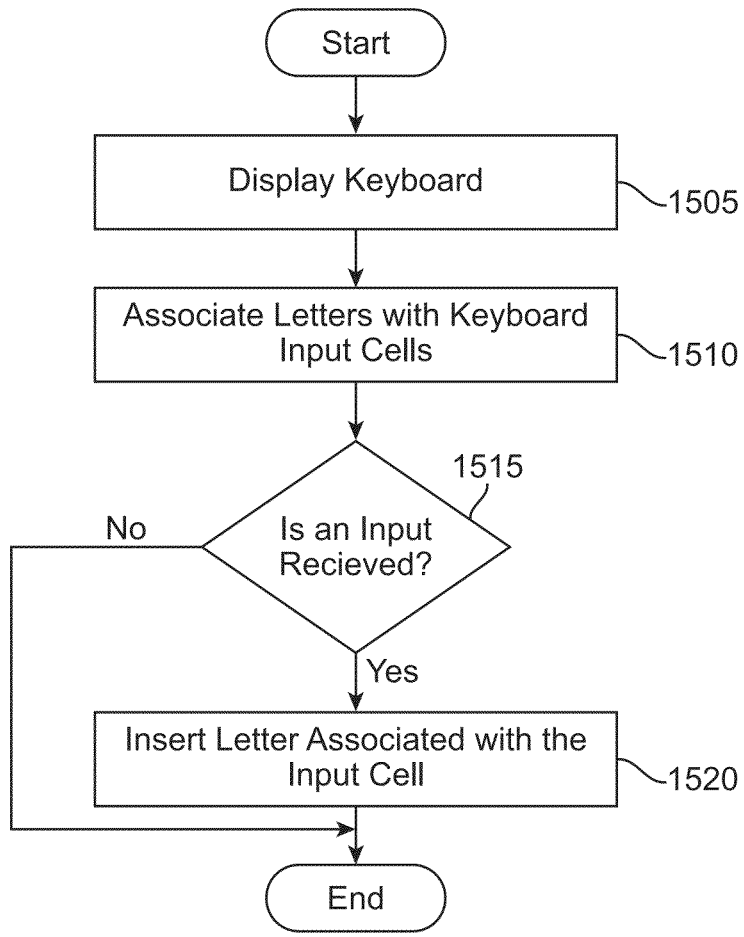
FIG. 15 illustrates an exemplary method embodiment of displaying a keyboard optimized for ease of use

FIG. 15 illustrates an exemplary method embodiment of displaying a keyboard optimized for ease of use. As illustrated, the method begins with a keyboard being displayed. The keyboard can consist of multiple input cells placed at various positions on the keyboard. The various positions can be ranked based upon a determined ease of selection of the input cell placed at the location. The ease of selection of an input cell can be determined in numerous ways. For example, in some embodiments, the number of adjacent input cells to the position can be used to determine the ease of selection of the input cell at the position. Thus, it can be determined that input cells placed at positions with less adjacent input cells are easier to select than input cells placed at positions with more adjacent input cells.

At block 1510, the letters are associated with the various input cells. The letters can be ranked based upon how common the letters are, or in other words, how often the letters occur in words of a language. The letters can be associated with the cells based on the ranking of how common the letters are and the ranking of the ease of selection of the input cell at each position. This can result in the most common letters being associated with input cells placed at positions that are easiest to select, while the least common letters are placed at positions that are hardest to select. Thus, the number of selections a puzzler has to make at a difficult to select position is minimized.

Although steps 1505 and 1510 are displayed as separate steps, this is just one embodiment. In some embodiments, the two steps occur concurrently. In some embodiments, the letters are associated with the input cells prior to the keyboard being displayed.

At block 1515 it is determined whether an input is received at one of the input cells included in the keyboard. If an input is received, the method continues to block 1520 where the letter associated with the block is inserted into a solution cell.

Discovery Adventure

In some embodiments, the computer-generated puzzle can be configured to enable a puzzler to go on a discovery adventure to learn more about the subjects relating to the clues and solutions of the puzzle. For example, additional information or links to additional information regarding a selected clue or solution can be presented alongside the puzzle to provide the puzzler with an opportunity to learn more if desired. A puzzler can thus read the provided information and/or select the provided links to learn more information on a specified subject.

As an example, when a clue and/or solution relating to the Golden Gate Bridge are selected by a puzzler, text providing the history of the Golden Gate Bridge can be presented to provide the user with background information. Further, an image or images of the Golden Gate Bridge can also be presented. In some embodiments, a link to the Golden Gate Bridge website or an encyclopedia page about the Golden Gate Bridge can also be provided.

In some embodiments, the image can be an active link to the additional information. Thus, a puzzler can select the image of the Golden Gate Bridge to be forwarded to a website containing additional information about the bridge. Alternatively, the puzzler can select the image to bring up text without being forwarded to a different site. For example, selecting the image of the Golden Gate Bridge can cause text about the Golden Gate Bridge to be presented over the image of the Golden Gate Bridge. Alternatively, selecting the image can bring up a window over the entirety of the Puzzle that can display the additional information.

In some embodiments, the puzzler can be presented with information regarding multiple subjects. For example, the puzzler can be presented with primary information describing a primary subject directly relating to a selected clue or solution, as well as secondary information describing secondary subjects related to the primary subject. In some embodiments, the secondary subjects can be related to the selected clue or solution, however not as closely related as the primary subject is.

For example, if the clue and solution are related to the Golden Gate Bridge, the primary subject can be the Golden Gate Bridge itself, while secondary subjects can be the city of San Francisco, other landmarks in San Francisco such as the Cable Cars, Coit Tower and Lombard Street, other famous bridges like the Brooklyn Bridge, other landmarks worldwide such as the Eiffel tower, etc. A puzzler interested in learning more about the primary subject can thus easily access any of the secondary subjects presented.

In some embodiments, a secondary subject can become the primary subject when selected by the puzzler, resulting in information regarding new secondary subjects being presented. For example, if the puzzler elects to receive more information regarding the secondary subject the Brooklyn Bridge, the Brooklyn Bridge can be designated the new primary subject and new secondary subjects related to the Brooklyn Bridge can be presented to the puzzler. For example, the secondary subjects can be the city of New York, other landmarks in the New York such as the Empire State Building, Statue of Liberty, Ellis Island, etc. A puzzler can thus embark on a discovery adventure by selecting the primary information and secondary information presented.

In some embodiments, the primary information and secondary information can each be presented as an image near the puzzle. This technique can further pique a puzzler's interest and lead the puzzler on a discovery adventure. For example, the primary subject the Golden Gate Bridge can be presented as an image of the Golden Gate bridge, while the secondary subject regarding the Coit Tower can be represented by an image of the Coit Tower and the secondary subject the Brooklyn Bridge can be presented by an image of the Brooklyn Bridge. A puzzler can select any image of interest to be provided with further information regarding the image.

This technique can be particularly useful to pique a puzzler's interest in a subject that may be unfamiliar to the puzzler. For example, the Golden Gate Bridge and Brooklyn Bridge may be easily identifiable, but many puzzlers may not be as familiar with art. Thus, a primary subject such as Monet can have secondary subjects which are specific impressionist paintings, either by Monet or other artists. A puzzler unfamiliar with art may have their interest piqued by an unfamiliar painting and be able to select the image to learn more.

In some embodiments, the primary subject can be presented to be distinct from the secondary subjects. For example, the primary subject can be presented as a large image while the secondary subjects can be presented as smaller images. When a user selects one of the smaller images representing a secondary subject, the selected image can replace the larger primary image as the secondary subject becomes designated the new primary subject. Further the smaller secondary images can be replaced with new smaller secondary images representing the new secondary subjects related to the new primary subject.

A puzzler can thus select through the various images to be guided on a discovery adventure through a variety of subjects. For example, a puzzler starting with the primary subject the Golden Gate Bridge can move through a variety of secondary subjects that can lead to a subject no longer related to the Golden Gate Bridge. For example, one can easily imagine how the Golden Gate Bridge can lead a puzzler to the Eifel Tower, then to France, French cooking and finally the chef Joel Robuchon.

In some embodiments, advertisements relating to the primary and/or secondary subjects can further be presented alongside the puzzle. For example, an advertisement for a restaurant in San Francisco can be presented when the primary subject is the Golden Gate Bridge. Likewise, an advertisement for a sightseeing tour in New York can be presented when the primary subject is the Statue of Liberty. As a puzzler selects new secondary subjects, thus making them the primary subject, the presented advertisement can be replaced to coincide with the new primary subject.

In some embodiments, the advertisement presented can further be targeted based on a user profile of the puzzler. For example, selection data indicating the primary and secondary subjects selected by a puzzler can be collected and used to create a user profile of the puzzler's likes and dislikes. This user profile data can be used to serve appropriate advertisements to the puzzler, as well as market targeted advertising to advertisers. For example, a marketer could target adds to specific demographics of puzzlers based on the puzzlers' likes and dislikes as determined from the gathered user profile data.

Returning to the discussion of FIG. 8, power puzzler 815 can be configured to present primary information and secondary information along with a puzzle. For example, in addition to displaying puzzles, puzzle module 875 can further be configured to present primary and secondary information alongside the puzzle. As a user selects the presented secondary information, puzzle module 875 can be configured to select new secondary subjects relating to the new primary subject selected by the user and present new primary and secondary information accordingly.

To select primary and secondary subjects, puzzle module 875 can be configured to communicate with Puzzle Data Database 840 which can be configured to maintain data regarding various subjects and the relationships between them. For example, Puzzle Data Database 840 can include an entry for various clues and solutions. Each of these entries can include a subject field identifying the subject of the entry as well as data describing the subject, such as images, links, text, etc. Each of these entries can also include related subjects and links to entries associated with those subjects. Puzzle module 875 can thus retrieve the primary subject and primary information from the subject information included in the entry associated with a selected clue or solution. Puzzle module 875 can select secondary subjects from the related subjects associated with the same entry and gather the necessary secondary information from the entries linked thereto. As a new subject becomes the primary subject, puzzle module can use the entry associated with the subject to select new secondary subjects and gather the necessary secondary information to display.

FIGS. 16A and 16B illustrate exemplary screenshots of primary and secondary information presented alongside a puzzle. As shown in FIG. 16A, primary information 1605 and secondary information 1610, 1615 1620 and 1625 are presented alongside puzzle 1630. As shown, primary information 1605 is presented larger than secondary information 1610, 1615, 1620 and 1625.

Primary information 1605 can present information about a primary subject related to a selected clue or solution in puzzle

1630. Each of secondary information 1610, 1615, 1620 and 1625 can present information about a different secondary subject related to the primary subject presented by primary information 1605. Thus, if primary information 1605 is presenting information about the Golden Gate Bridge, secondary information 1610, 1615, 1620 and 1625 can present information about secondary subjects related to the Golden Gate Bridge. For example secondary information 1610 can present information about San Francisco, secondary information 1615 can present information about the Brooklyn Bridge, secondary information 1620 can present information about Coit Tower, and secondary information 1625 can present information about Alcatraz.

In addition to primary information 1605 and secondary information 1610, 1615, 1620 and 1625, advertisement 1635 can also be presented alongside puzzle 1630. Advertisement 1635 can be related to the primary subject that is presented by primary information 1605. For example, if primary information 1605 is presenting information about the Golden Gate Bridge, advertisement 1635 can present an advertisement for a sightseeing tour in San Francisco.

In some embodiments, each of primary information 1605 and secondary information 1610, 1615, 1620 and 1625 can present an image related to their associated subject. For example, primary content 1605 can present an image of the Golden Gate Bridge, secondary information 1610 can present an image of San Francisco, secondary information 1615 can present an image of the Brooklyn Bridge, secondary information 1620 can present an image of the Coit Tower, and secondary information 1625 can present an image of Alcatraz.

Further, in some embodiments, primary information 1605 can also present text relating to the primary subject. For example, primary information 1605 can present text about the history of the Golden Gate Bridge over the image of the Golden Gate Bridge. In some embodiments, primary information 1605 can present only an image until a puzzler selects primary content 1605, for example by clicking on primary content 1605, at which time the accompanying text can be displayed.

In some embodiments, a secondary subject presented by one of secondary information 1610, 1615, 1620 and 1625 can become the primary subject upon selection by a puzzler. For example, if a puzzler wants to learn more about the Brooklyn Bridge, the puzzler can select secondary information 1615, for example by clicking on secondary information 1615, and primary information 1605 can be replaced by secondary information 1615.

FIG. 16B illustrates a screenshot after a puzzler has selected secondary information 1615. As shown, secondary information 1615 is now presented larger and in the place where primary information 1605 had been presented. Further secondary information 1610, 1615, 1620 and 1625 have also been replaced by secondary information 1640, 1645, 1650 and 1655, each of which can present information about a subject related to the subject of secondary information 1615 (i.e. the Brooklyn Bridge). For example secondary information 1640 can present information about the Empire State Building, secondary information 1645 can present information about New York City, secondary information 1650 can present information about the Statue of Liberty and secondary information 1655 can present information about Ellis Island.

Further, advertisement 1635 has been replaced by advertisement 1660 which can be related to primary information 1615. For example, advertisement 1660 can be an advertisement for a sightseeing tour in New York. Thus, as illustrated, when a puzzler selects secondary content 1615 as presented in FIG. 16A, secondary content 1615 becomes the primary content in the next screen presented in FIG. 16B. Each of secondary information 1640, 1645, 1650 and 1655 can present information related to the subject of primary information 1615 and advertisement 1660 can be an advertisement related to secondary information 1615, which is now the primary subject.

Figure 17:
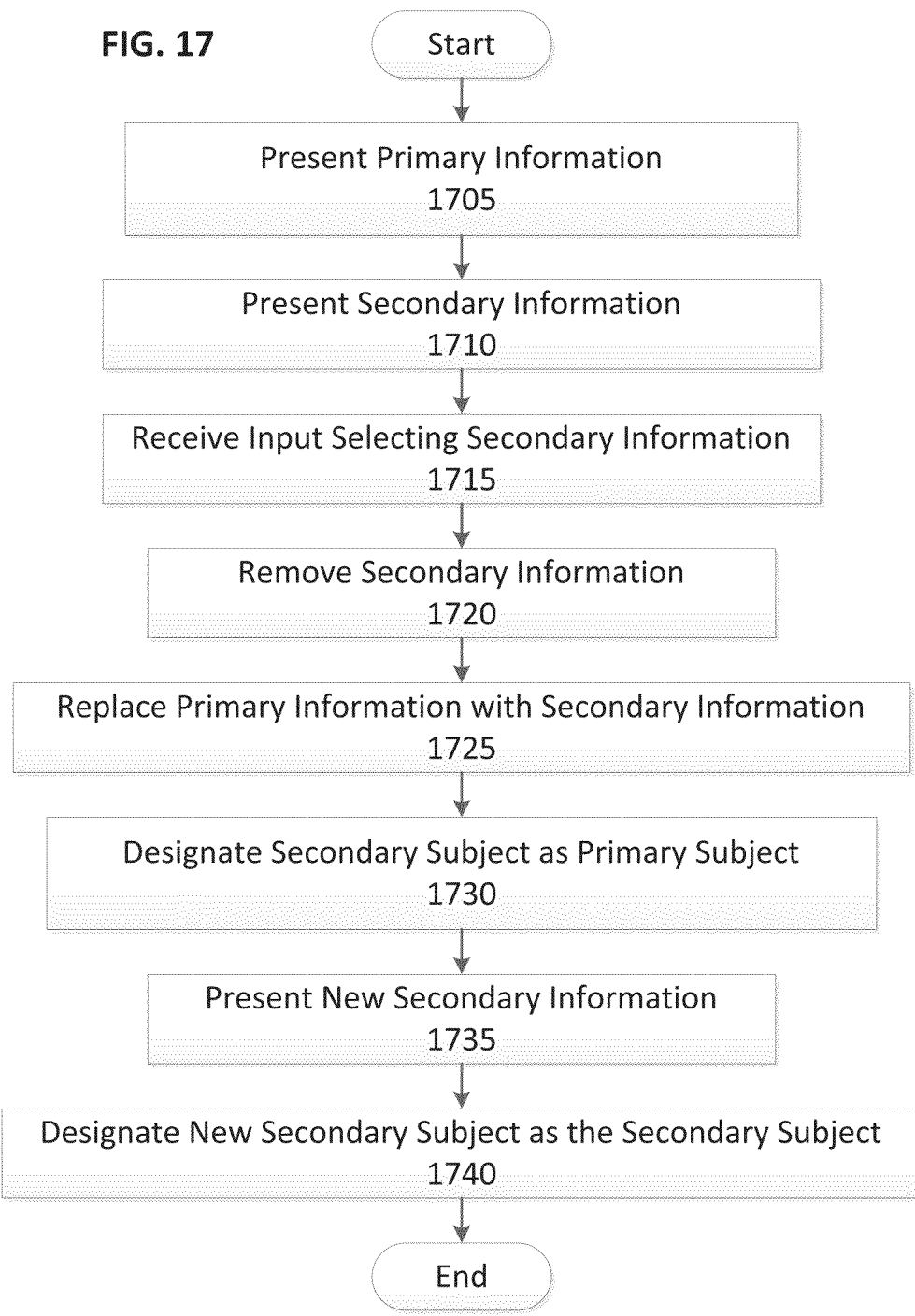
FIG. 17 illustrates an exemplary method embodiment of presenting primary and secondary information alongside a puzzle.

FIG. 17 illustrates an exemplary method embodiment of presenting primary and secondary information alongside a puzzle. As shown, the method begins at block 1705 where primary information is presented alongside the puzzle. The primary information can present information about a primary subject related to a selected clue or solution of the puzzle.

The method then continues to block 1710 where secondary information is presented alongside the primary information and the puzzle. The secondary information can present information related to the primary subject. While in this embodiment the primary and secondary information are presented alongside a puzzle and the primary subject is related to a selected clue, this is only one embodiment and is not meant to be limiting. In some embodiments the primary and secondary information can be presented without a puzzle present. In this type of embodiments, the primary subject can be any subject selected based on any of a variety of criteria.

Upon presenting the primary and secondary information, the method then continues to block 1715 where an input selecting the secondary information is received. For example, the secondary information can be selected by a puzzler clicking on the secondary information.

The method then continues to block 1720 where the secondary information is removed. This can include removing the selected secondary information item as well as any unselected secondary information items presented.

The method then continues to block 1725 where the primary information is replaced by the selected secondary information item. The secondary subject of the selected secondary information item is then designated as the primary subject 1730.

At block 1735 new secondary information is presented in place of the removed secondary information. The new secondary information can present information related to a new secondary subject related to the selected secondary subject that was designated as the primary subject in block 1730. The method then continues to block 1740 where the new secondary subject is designated as the secondary subject. The method then ends.

It should be noted that although the method ends, the method can be repeated with the selected secondary subject as the new primary subject and the new secondary subjects as the secondary subjects. Thus a puzzler can repeatedly select secondary information to designate the associated secondary subject as the new primary subject and further be presented with new secondary information describing new secondary subjects related to the selected secondary subject that was designated as the primary subject. In this way the puzzler can go on a continuous discovery journey through new subjects of interest.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

I claim:

1. A method comprising:
presenting, alongside a computer-generated puzzle:
primary information describing a primary subject related to a selected clue or solution of the computer-generated puzzle;
secondary information describing a secondary subject related to the primary subject; and
wherein the primary information and secondary information have been received over a communications network from a first computing device;
receiving, from a second computing device, input indicating a selection of the secondary information;
replacing the primary information with the secondary information; and
designating the secondary subject as the primary subject.

2. The method of claim 1, wherein the primary information is presented larger than the secondary information.

3. The method of claim 1, further comprising:
presenting a first advertisement relating to the primary subject, wherein upon receiving the input indicating selection of the secondary information, the first advertisement is replaced with a second advertisement relating to the secondary subject designated as the primary subject.

4. The method of claim 1, wherein the primary information is an image describing the primary subject and the secondary information is an image describing the secondary subject.

5. The method of claim 4, further comprising:
upon receiving input indicating selection of the primary information, presenting text describing the primary subject.

6. The method of claim 3, further comprising:
receiving input indicating a selection of a new clue or solution:
replacing the primary information with new primary information describing a new primary subject related to the new clue or solution, wherein the new primary subject is designated as the primary subject; and
replacing the secondary information with new secondary information describing a new secondary subject related to the new primary subject.

7. The method of claim 6, further comprising:
replacing the second advertisement with a third advertisement relating to the new primary subject.

8. A system comprising:
a processor; and
a memory containing instructions that, when executed, cause the processor to:
present, alongside a computer-generated puzzle:
primary information describing a primary subject related to a selected clue or solution of the computer-generated puzzle;
secondary information describing a secondary subject related to the primary subject; and
wherein the primary information and secondary information have been received over a communications network from a first computing device;
receive, from a second computing device, input indicating selection of the secondary information;
replace the primary information with the secondary information; and
designate the secondary subject matter as the primary subject.

9. The system of claim 8, wherein the primary information is presented larger than the secondary information.

10. The system of claim 8, wherein the instructions further cause the processor to:
present a first advertisement relating to the primary subject, wherein upon receiving the input indicating selection of the secondary information, the first advertisement is replaced with a second advertisement relating to the secondary subject designated as the primary subject.

11. The system of claim 8, wherein the primary information is an image describing the primary subject and the secondary information is an image describing the secondary subject.

12. The system of claim 11, wherein the instructions further cause the processor to:
upon receiving input indicating selection of the primary information, present text describing the primary subject.

13. The system of claim 10, wherein the instructions further cause the processor to:
receive input indicating a selection of a new clue or solution:
replace the primary information with new primary information describing a new primary subject related to the new clue or solution; and replace the secondary information with new secondary information describing a new secondary subject related to the new primary subject.

14. The system of claim 13, wherein the instructions further cause the processor to:
replace the second advertisement with a third advertisement relating to the new primary subject designated as the primary subject.

15. A non-transitory computer-readable medium containing instructions that, when executed by a computing device, cause the computing device to:
present, alongside a computer-generated puzzle:
primary information describing a primary subject;
secondary information describing a secondary subject related to the primary subject; and
wherein the primary information and secondary information have been received over a communications network from a first computing device;
receive, from a second computing device, input indicating selection of the secondary information;
replace the primary information with the secondary information; and
designate the secondary subject as the primary subject.

16. The non-transitory computer-readable medium of claim 15, wherein the primary information is presented larger than the secondary information.

17. The non-transitory computer-readable medium of claim 15, wherein the instructions further cause the processor to:
present a first advertisement relating to the primary subject, wherein upon receiving the input indicating selection of the secondary information, the first advertisement is replaced with a second advertisement relating to the secondary subject designated as the primary subject.

18. The non-transitory computer-readable medium of claim 15, wherein the primary information is an image describing the primary subject and the secondary information is an image describing the secondary subject.

19. The non-transitory computer-readable medium of claim 18, wherein the instructions further cause the computing device to:
upon receiving input indicating selection of the primary information, present text describing the primary subject.

20. The non-transitory computer-readable medium of claim 15, wherein the instructions further cause the computing device to:
receive input indicating a selection of a clue or solution of a computer-generated puzzle:
replace the primary information with new primary information describing a new primary subject related to the clue or solution; and
replace the secondary information with new secondary information describing a new secondary subject related to the new primary subject.

* * * * *